(12) United States Patent
Rubin

(10) Patent No.: US 9,330,358 B1
(45) Date of Patent: May 3, 2016

(54) CASE-BASED REASONING SYSTEM USING NORMALIZED WEIGHT VECTORS

(71) Applicant: The United States of America as represented by the Secretary of the Navy, Washington, DC (US)

(72) Inventor: Stuart H. Rubin, San Diego, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 478 days.

(21) Appl. No.: 14/037,640

(22) Filed: Sep. 26, 2013

Related U.S. Application Data

(63) Continuation-in-part of application No. 13/734,669, filed on Jan. 4, 2013, now Pat. No. 9,299,025.

(51) Int. Cl.
  *G06F 17/00* (2006.01)
  *G06N 5/04* (2006.01)

(52) U.S. Cl.
  CPC .................................. *G06N 5/04* (2013.01)

(58) Field of Classification Search
  None
  See application file for complete search history.

(56) References Cited

U.S. PATENT DOCUMENTS

| | | | | |
|---|---|---|---|---|
| 4,924,518 A | * | 5/1990 | Ukita | G10L 15/00 704/239 |
| 6,144,964 A | * | 11/2000 | Breese | G06F 17/30867 707/758 |
| 7,047,226 B2 | | 5/2006 | Rubin | |
| 7,158,961 B1 | * | 1/2007 | Charikar | G06F 17/3069 |
| 8,073,804 B1 | | 12/2011 | Rubin | |
| 8,117,147 B1 | | 2/2012 | Rubin | |
| 8,250,022 B1 | | 8/2012 | Rubin | |
| 8,280,831 B1 | | 10/2012 | Rubin | |
| 8,285,728 B1 | | 10/2012 | Rubin | |
| 8,315,958 B1 | | 11/2012 | Rubin | |
| 8,447,720 B1 | * | 5/2013 | Rubin | G06N 5/025 706/46 |
| 8,938,437 B2 | * | 1/2015 | Hickey | 707/706 |
| 2003/0194144 A1 | * | 10/2003 | Wenzel | G06K 9/6204 382/242 |
| 2009/0254543 A1 | * | 10/2009 | Ber | G06F 17/30675 |
| 2010/0194932 A1 | * | 8/2010 | Mitsuya | H04N 5/3572 348/241 |

(Continued)

OTHER PUBLICATIONS

Shin, et al., "A case-based approach using inductive indexing for corporate bond rating," Decision Support Systems 32 (2001), pp. 41-52, 2001.*

(Continued)

*Primary Examiner* — Kakali Chaki
*Assistant Examiner* — Fuming Wu
(74) *Attorney, Agent, or Firm* — Spawar Systems Center Pacific; Kyle Eppele; Ryan J. Friedl

(57) ABSTRACT

A system and method include comparing a context to cases stored in a case base, where the cases include Boolean and non-Boolean independent weight variables and a domain-specific dependency variable. The case and context independent weight variables are normalized and a normalized weight vector is determined for the case base. A match between the received context and each case of the case base is determined using the normalized context and case variables and the normalized weight vector. A skew value is determined for each category of domain specific dependency variables and the category of domain specific dependency variables having the minimal skew value is selected. The dependency variable associated with the selected category is then displayed to a user.

7 Claims, 8 Drawing Sheets

(56) References Cited

U.S. PATENT DOCUMENTS

| | | | | |
|---|---|---|---|---|
| 2010/0201828 | A1* | 8/2010 | Mitsuya | H04N 5/3572 348/208.6 |
| 2011/0072012 | A1* | 3/2011 | Ah-Pine | G06F 17/30274 707/725 |
| 2012/0166439 | A1* | 6/2012 | Poblete | G06F 17/3089 707/737 |
| 2013/0073533 | A1* | 3/2013 | Hickey | G06F 17/30011 707/706 |

OTHER PUBLICATIONS

O'Leary, "Verification and Validation of Case-Based Systems," Expert Systems With Applications, vol. 6, pp. 57-66, 1993.*

Chang et al., "Indexing and retrieval in machining process planning using case-based reasoning," Artificial Intelligence in Engineering 14 (2000) pp. 1-13, 2000.*

Stahl, "Learning of Knowledge-Intensive Similarity Measures in Case-Based Reasoning," PhD Dissertation, Universitat Kaiserslautern, 2003.*

Nunez et al., "A comparative study on the use of similarity measures in casebased reasoning to improve the classification of environmental system situations," Environmental Modelling & Software, 11 pages, 2003.*

Rubin, Stuart H., "On Randomization and Discovery", Journal of Informational Sciences, vol. 177, issue 1, pp. 170-191, Jan. 2007.

Rubin, Stuart H., "Computing With Words", IEEE Transactions on Systems, Man, and Cybernetics—Part B: Cybernetics, vol. 29, No. 4, pp. 518-524, Aug. 1999.

Rubin, S.H., Murthy, S.N.J., Smith, N.H., and Trajkovic, L., "KASER: knowledge Amplification by Structured Expert Randomization," IEEE Transactions on Systems, Man, and Cybernetics—Part B: Cybernetics, vol. 34, No. 6, pp. 2317-2329, Dec. 2004.

Chaitin, G.J., "Randomness and Mathematical Proof," Sci. Amer., vol. 232, No. 5, pp. 47-52, 1975.

Rubin, Stuart H., Chen, S., and Shyu, M., "Field Effect Natural Language Semanitc Mapping", IEEE International Conference on Systems, Man, and Cybernetics, vol. 3, pp. 2483-2487, Oct. 5-8, 2003.

* cited by examiner

| Wts: | $w_1$ | $w_2$ | $w_3$ | ... | $w_n$ | | Dep. | Prv | Nxt. |
|---|---|---|---|---|---|---|---|---|---|
| Ind: | $ind_1$ | $ind_2$ | $ind_3$ | ... | $ind_n$ | | | | |
| Feature: | Non-B | Bool | Non-B | ... | Bool | | | | |
| Shift: | 0 | - | 0 | ... | - | | d | - | - |
| $c_1$ | 10 | 0 | 5 | ... | 1 | ↑ | 1 | 0 | 2 |
| $c_2$ | 15 | 1 | 10 | ... | 0 | ↑ | 2 | 1 | 3 |
| $c_3$ | * | * | 15 | ... | 0 | ↑ | 2 | 2 | m |
| ... | ... | ... | ... | ... | ... | ... | ... | ... | ... |
| $c_m$ | 5 | 1 | 10 | ... | 1 | ↑ | 1 | 3 | 0 |

Acquired/Fired Cases Moved to the Logical Head — Weight to Discriminate — Expunge LRU'd — Weight to Reinforce Context ⟶ $d_i$ using Uniform or 3-2-1 Skew
Squelch if not significant - a domain-specific evaluation.

FIG. 6

```
Define Boolean Weather_Change_Feature (var x, t):
  /* In general, schemas may call other schemas. */
  Randomly select x {pressure, humidity, temperature};
  t1, t2 {t, t-1, t-2, t-3};
  Randomly select t1, t2 such that t2 > t1;
  If x(t2) {>, <} x(t1)
    Return (1)
  Return (0).
```

```
Define Boolean Pressure_Increase_Feature (pressure, t):
  If pressure(t) > pressure(t-1)
    Return (1)
  Return (0).
```

CASE-BASED REASONING SYSTEM USING NORMALIZED WEIGHT VECTORS

CROSS-REFERENCES TO RELATED APPLICATIONS

This application is a continuation-in-part of commonly-assigned U.S. patent application Ser. No. 13/734,669 filed Jan. 4, 2013, entitled "Case-Based Reasoning System Using Case Generalization Method", the content of which is fully incorporated by reference herein.

FEDERALLY SPONSORED RESEARCH AND DEVELOPMENT

The Case-Based Reasoning System Using Normalized Weight Vectors is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email sscpac_T2@navy.mil. Reference Navy Case No. 101988.

BACKGROUND

Artificial intelligence technologies, such as neural networks and expert systems, are generally unsatisfactory for realizing tripwires. Neural networks cannot perform logical inferences on previous training, while expert systems do not scale well and are costly to maintain. While case-based reasoning systems are an improvement over the aforementioned technologies, they have not yet fully solved the generalization problem—that is, how to match a case to a most-similar one for replay. Accordingly, improvements are needed in case-based reasoning systems to, for example, provide an effective capability to automatically compile and review system readiness and performance data to yield system readiness alerts.

BRIEF DESCRIPTION OF THE DRAWINGS

FIG. 6 shows a diagram illustrating the evolution of weighted situational variables in accordance with the Case-Based Reasoning System Using Normalized Weight Vectors.

DETAILED DESCRIPTION OF SOME EMBODIMENTS

Figure 1:
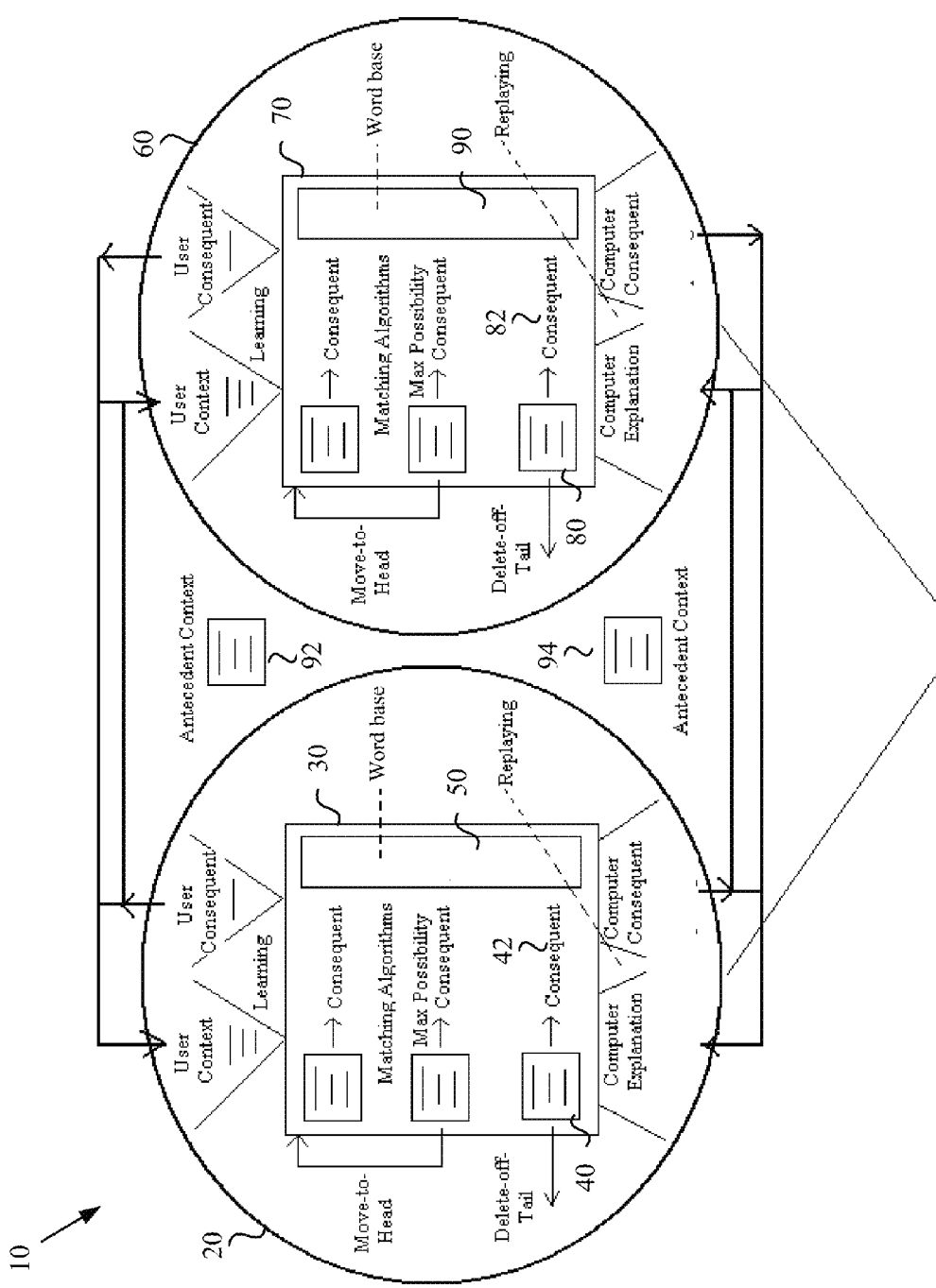
FIG. 1 shows a block diagram of the operation of one embodiment of a system in accordance with the Case-Based Reasoning System Using Normalized Weight Vectors.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Further, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the disclosed embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. Different parts of the algorithm could be embodied in different elements of hardware or software, for example, as in a distributed system.

The overarching goal of randomization is to reduce data or knowledge to a more general form, which in the process of reduction induces hypothetical knowledge (i.e., symmetric knowledge). If this symmetric knowledge holds, then we say that randomization has occurred and as a consequence, the generality and latent intelligence of the knowledge base has increased. Otherwise, random point(s) of departure serve as foci for the development of novel knowledge—not previously known by the base. The acquisition of random knowledge serves to increase the scope and latent intelligence of the base too. It follows that since all knowledge can be characterized as random or symmetric that this system for knowledge generation has the theoretical potential to emulate human creativity and thought.

Cases capture one or more salient (or even not so relevant) independent variables and associate these situations (features) with some action or dependency. There has been previous work on generalizing case bases as well as inductive inference as a generalization technique. Some of these approaches use the case base to constrain the validity of the evolved rule base. That is, if there should exist a case situation, which covers a rule antecedent then the rule consequent is constrained to agree with the case action lest contradiction on the proper action result. This approach does not allow for non determinism. However, there are inherent problems with excluding non determinism.

Nature is inherently non deterministic. Causality is only rarely definable for an arbitrary situation. While deterministic systems are clearly useful in such applications as process control, they are not necessarily practical for modeling applications involving uncertainty. Further, the evolution of knowledge requires an allowance for some measure of trial and error. If only cases and not rules are evolved and permitted such variance, then only previously observed solutions can be acquired—effectively negating all system creativity short of possibly erroneous situational generalization.

Additionally, as evolved rule bases grow in size, their constituent rules tend to compete for being triggered by an arbitrary context. The problem here is not that this is secondary non determinism; but rather, valid generalized rules cannot be known a priori. This implies that any secondary non deterministic selection will be more or less biased by the lack of generalization knowledge. This is manifested in erroneous fired consequents, leading to the acquisition of new cases, which in turn may be improperly generalized—providing deleterious feedback. Of course, as the case base gets large enough, the chance of this error is mitigated by the numerous case constraints. But then, this inherent error reemerges as excessive search time (and/or as a requirement for extraneous parallel hardware) to speedup constraint matching and case generalization.

An alternative approach, which provides for the non-deterministic generalization of case bases, can be justified. That is, the inherent error of generalization can be accepted if the system is not admissible (i.e., not necessarily optimal). This means that rather than attempting to remove all errors of generalization, one can seek to speed-up the generalization process for application to very large data/knowledge bases. Furthermore, the result will be eminently practical if the generalization process is dynamic and iterative. To be dynamic, it must accept new situational features and identify relatively irrelevant features to be replaced or dropped. To be iterative, it must acquire new cases whenever situational predictions are deemed to be incorrect. The predictive system must be efficiently updated whenever an existing case is fired, a new case is acquired, and/or a least-recently used (LRU'd) one is expunged.

The main point of departure, which may be surmised from the preceding arguments, is that it is eminently more practical to evolve weighted case situational variables and features than to evolve rules from any defined case base. This follows because in the absence of additional information/knowledge, one cannot decrease the entropy of a non-deterministic case base by converting it to rules. Further, deterministic systems require the maintenance of the case space for constraint checking. While rules allow for faster processing, their validity is subject to greater error than that of the matched cases.

Also, case bases can grow much larger than rule bases because they are devoid of local interactions. Thus, unlike case bases, the evolution of rule bases necessarily slows with scale. This slowdown cannot be adequately offset by parallel/distributed processors because again, all known quality rule inference algorithms are of super-linear complexity. The only exception is found in the use of knowledge bases for rule inference. But then, this approach is voided because the problem is merely passed to the next higher level—how to acquire the knowledge for the knowledge bases.

Situational features are in a constant state of evolution in any non trivial case-based system. Weights need to evolve to favor salient features and identify relatively irrelevant ones for deletion. To begin, the case-based approach will be developed for an arbitrary case base. All non-Boolean data is converted to positive real numbers. If the data exists along a continuum, then if "a" is closer to "b" than "c" conceptually, then the same relation must hold numerically.

The only question that arises, in this regard, is how to assign integers to words, phrases, or sentences in satisfaction of this requirement. First, notice that any partial ordering here is domain specific. For example, the colors of the rainbow may be labeled and arranged in accordance with their frequency in angstroms. This arrangement is likely to differ from an arrangement based on clothing sales predicated on color. In a related vein, if the South Pole of the Earth is assigned +1 and the North Pole is assigned +3, then the equator must be assigned +2 based on geometric locality. However, if based on average annual temperature say, then the South and North Poles of the Earth may be assigned +1 and the equator may be subsequently assigned +3. Notice that temperate zones have a resulting value of +2. There are a countably infinite number of such domain mappings, based on conceptualization, and each situation must be evaluated on the basis of its salient details. Bidirectional translation between conceptual entity and real number representation may be achieved using a (hash) table lookup. For example, +1 might represent a very cold average annual temperature and +3 might represent a very hot average annual temperature—with real number graduations in between. In the large, such translation can be performed by case base segments.

Care must be taken in scaling the non-Boolean variables that the lower-end of the range is low enough (or subsequent contexts will not be properly mapped), but not excessively low (or mapped variables will lose precision). Negative lower-ends are permissible so long as they (and associated vector elements) are shifted to positive values for use by the methodology (e.g., {−100%, 0%, +100%} becomes {+1, +101, +201}). Similarly, based on average annual temperature, the South and North Poles of the Earth may be assigned −1 and the equator may be assigned +1. Here, {−1, +1, −1} becomes {+1, +3, +1}. Situational variables and features are assumed to be linear though exponential and logarithmic evaluations may find occasional use when dealing with very small or very large numbers. Note that the maintenance of such shifting operations entails additional computational overhead though not enough to change the algorithms order of magnitude complexity.

Features should augment the associated situation(s). These features should never be manually dropped. If they are released and/or replaced, this decision must be based on receiving a relatively insignificant weight. For example, a temperature variable might need to distinguish the three natural states of water—solid, liquid, and gas. Here are a few tuples that serve to illustrate the aforementioned associations, Schema: (Temperature ° F., Freezing?, Boiling?), (32°, 1, 0), (72°, 0, 0), and (212°, 0, 1). The use of Boolean features is very common and effective. Suppose that a case base is needed for a number-theoretic problem requiring the identification of prime numbers. An algorithm for identifying prime numbers, such as the Sieve of Eratosthenes, defines the feature. For example, Schema: (Integer, Prime?), (3, 1), (4, 0), (17, 1), (10, 0), (23, 1), and (24, 0).

Suppose that we had the following case base, where $c_i$ are cases, $w_j$ are weights, the $i_j$ are situational variables (features), and d is the associated dependency category within some class (e.g., automotive diagnostics). Here, an asterisk, "*", represents a situational variable whose value is unknown, or was not recorded. Also, cases are acquired at the logical head, moved to the logical head when fired, and expunged from the logical tail when necessary to release space (see FIG. 6). Table 1 presents the schema for an arbitrary case base. The cases are shown in logical order, which is used by the uniform or 3-2-1 skew. The use of this skew is optional (i.e., in comparison with uniform weighting) and is useful for domains where the value of the data deteriorates in linear proportion to its time of collection—valuing more recent data, more highly. The selection of a particular skew is domain specific. For example, the rate of radioactive decay is known to be proportional to how much radioactive material is left (excluding the presence of certain metals). The nuclear decay equation may be used as a skew for various radioactive materials and is given by $A(t)=A_0 e^{-\lambda t}$. Here, $A(t)$ is the quantity of radioactive material at time t, and $A_0=A(0)$ is the initial quantity. $\lambda$ (lambda) is a positive number (i.e., the decay constant) defining the rate of decay for the particular radioactive material. A countably infinite number of other skews may be applicable.

In the following assignment of skew-weights, the skew vector, S, favors the logical head of the case base in keeping with Denning's principle of temporal locality. Cases, which were most-recently acquired or fired, and thus appear at or nearer to the logical head of a case-base, are proportionately more heavily weighted under the 3-2-1 skew. Of course, this differs from a uniform skew. The closer a case is to the top of its linked list, the greater its weight or importance. A heuristic scheme (i.e., the 3-2-1 skew) for achieving this with a dependency category consisting of d cases is to assign the head case a weight of $$\frac{2d}{d(d+1)}.$$

The map just below the head map has a weight of $$\frac{2(d-1)}{d(d+1)}.$$

Finally, the tail map of the segmented case base has a weight of $$\frac{2}{d(d+1)}.$$

The ith map from the head has a weight of $$\frac{2(d-i+1)}{d(d+1)},$$

for i=1, 2, . . . , d. For example, using a vector of four weights, the 3-2-1 skew (S) is $S=(0.4, 0.3, 0.2, 0.1)^T$. There are a countably infinite number of possible skews, such that $\Sigma_{s_k}=1.0$.

The evaluation of the members of a dependency category is the contiguous weighted sum of its constituent elements (see below). A subsequent example will show how the weights are computed using the uniform and 3-2-1 skews, which again may be selected because they best fit domain characteristics. The weights are uniform if the skew is not known, or if there is no decay in the value of a case once recorded.

Table 1 shows a doubly-linked list. Zero indicates a list end. The list-head of the previous list is m and of the next list is one. The list-head of the free list (i.e., unused array elements) begins with the list-head of the previous list if the rows are fully utilized. Otherwise, the list-head of the free list points to the first row in the list of unutilized rows, in sequence. It simply contains every freed row, in arbitrary order.

Shift values are maintained for each non-Boolean variable (Table 1). These shifts are initialized to one minus the minimum field values, or zero—whichever is greater. If the resultant shift exceeds zero, each non-Boolean variable is initially shifted up by the computed shift value. Whenever a new contextual or situational variable has value less than or equal to the negation of its corresponding shift, then the shift takes the absolute value of that variable plus one. Non-Boolean variables not previously shifted (e.g., the context) will be shifted up by that amount, while all previously shifted ones (e.g., field values) will be shifted up by the values new—old shifts. Whenever a case is expunged, if the expunged non-Boolean variables have values of one, then new field minimums are found (i.e., an O(m) process) and if their values exceed one, the associated shifts and the previously shifted variables are both reduced by the amount that those values exceed one. Thus, all non-Boolean non-asterisk variables will have value of at least one. This prevents divide-by-zero errors in normalization as well as problems in adjusting zero-valued weights.

TABLE 1

| Wts: | $w_1$ | $w_2$ | $w_3$ | ... | $w_n$ | → | Dep. | Prv. | Nxt. |
|---|---|---|---|---|---|---|---|---|---|
| Ind: | $ind_1$ | $ind_2$ | $ind_3$ | ... | $ind_n$ | → | — | — | — |
| Feature: | Non-B | Bool | Non-B | ... | Bool | → | d | — | — |
| Shift: | 0 | — | 0 | ... | — | ... | — | — | — |
| $c_1$ | 10 | 0 | 5 | ... | 1 | → | 1 | 0 | 2 |
| $c_2$ | 15 | 1 | 10 | ... | 0 | → | 2 | 1 | 3 |
| $c_3$ | * | * | 15 | ... | 0 | → | 2 | 2 | m |
| ... | ... | ... | ... | ... | ... | ... | ... | ... | ... |
| $c_m$ | 5 | 1 | 10 | ... | 1 | → | 1 | 3 | 0 |

Next, define a context by $c_j$ for j=1, 2, . . . , n. The nearness of a pair of cases, $c_i$ and $c_j$, where the context is taken as $c_j$, is given by $$\text{match}(i) = \frac{\sum_{k=1}^{n} w_k |c_{i,k} - c_{j,k}|}{|\text{participating situational variables}|}, i \neq j. \quad \text{(Eq. 1)}$$

It follows that since all weights and participating variable differences are normalized, match(i)∈[0,1]. A participating situational variable is one that does not include an "*" in its field. If there are no such fields, then the pair of cases is omitted from the computation. If there are no such pairs of cases, then the match cannot be computed and thus is undefined.

The ranges of non-Boolean variables are normalized using double-precision computations. The non-Boolean vectors are to be defined by positive elements. This is necessary to insure that any paired case differential, $|c_{i,k}-c_{j,k}|$, will never exceed unity. There are to be at least one non-Boolean vector containing no asterisks. This is necessary to prevent divide-by-zero errors. The sums used for normalization are saved for the subsequent normalization of any context. The sums for situational variables $ind_1$ and $ind_3$ in Table 1 are 30 and 40, respectively (asterisks are skipped). Normalization of these variables is shown in Table 2. Boolean and non Boolean contextual differences will all be comparable (i.e., resulting in a uniform contribution of their importance, conditioned by their associated weight), since no paired case differential, $|c_{i,k}-c_{j,k}|$, will ever exceed unity.

The dependency category selected to be fired will be the weighted match (i), which has a minimal category value (see below). In the event of a tie, the dependency averaging (i.e., substituting the case dependencies relative position from the logical head for its match (i) value), nearer (at) the logical head of the case base is selected as the winner as a result of temporal locality. The single case dependency, which is nearer (at) the logical head, is selected as the winner in the event of a second tie (e.g., d=1 in Table 2 because (1+4)/2=(2+3)/2, but $c_1$ is the logical head). Using 3-2-1 skew weighting, d=1 wins again because $(\frac{2}{3}*1+\frac{1}{3}*4)<(\frac{2}{3}*2+\frac{1}{3}*3)$. Relative fused possibilities are produced (e.g., using the uniform or 3-2-1 skew), which evidence that the decision to favor one category dependency over another may be more or less arbitrary. Of course, in some domains it may be more appropriate to present the user with an ordered list of alternative dependency categories, along with their weighted match (i) values, and let the user decide. The decision is necessarily a domain-specific one.

There are domains for which it is useful to know that the case base does not embody the desired matching case(s) and all but perhaps the slightest "guessing" is to be enjoined. This can be achieved by placing a squelch, greater than or equal to zero, on the minimum match (i). Here, if this minimum computed match (i) just exceeds the set squelch, then the system will respond with, "I'm very unsure of the correct action". The correct action dependency (d) will be paired with the context and acquired as a new case, at the earliest opportunity, if the dependency should prove to be incorrect. This dependency may or may not comprise a new action category. The logical tail (LRU'd member) of the case base may be expunged, as necessary, to make room for the new case acquisition. The qualifying phrases are, "very unsure", "somewhat unsure", "somewhat sure", "very sure", depending on the difference, (minimum match (d)–squelch, where d represents a dependency category). Notice that an exact match would have a difference of –squelch. Thus, any difference≤–squelch/2 would be associated with the qualifier, "very sure". Any –squelch/2≤difference≤squelch/2 would be associated with the qualifier, "somewhat sure". Any squelch/2≤difference≤squelch would be associated with the qualifier, "somewhat unsure". Finally, any squelch<difference would be associated with the qualifier, "very unsure". The most appropriate value for the squelch may be determined experimentally and is domain specific.

The acquisition of a new case here not only insures that its situational context will be known until, if ever, the case falls off of the logical tail of the case base, but contexts in its immediate field (i.e., having minimal differences with it) will likewise be associatively known. Cases identified as erroneous may be a) overwritten with the correct dependency, if known, b) expunged, or c) bypassed through the acquisition of a correct case at the logical head of the case base so that the erroneous case will eventually fall off of the logical tail of the case base. The choice of methodology here is domain specific in theory. In practice, alternative (a) is the usual favorite, where the domain is deterministic. Alternative (b) is the usual favorite, where correct actions are not forthcoming. Alternative (c) is the usual favorite, where the domain is non deterministic (assumed herein).

Next, consider the arbitrary case base shown in Table 2. Two dependency categories and two case instances mapping to each category are observed. The goal is to find a normalized set of weights, $w_j$, which will serve in mapping an arbitrary context to the best-matching case situation and thus to the most appropriate action category, if any. The squelch may be taken to be 0.1 here on the basis of trial and error for this example. If the minimum computed match (i)>0.1, then the system will reply to the effect that it is very unsure of the correct action. A correct case will be acquired at the logical head, if the correct action is known, should the dependency prove to be incorrect. In this event, the LRU'd case at the logical tail may be expunged to make room.

TABLE 2

| Wts: | $w_1$ | $w_2$ | $w_3$ | $w_4$ | | Dep. |
|---|---|---|---|---|---|---|
| Ind: | $ind_1$ | $ind_2$ | $ind_3$ | $ind_4$ | | |
| Feature: | NB | Bool | NB | Bool | → | d |
| $c_1$ | 0.333 | 0 | 0.125 | 1 | → | 1 |
| $c_2$ | 0.5 | 1 | 0.25 | 0 | → | 2 |
| $c_3$ | * | * | 0.375 | 0 | → | 2 |
| $c_4$ | 0.167 | 1 | 0.25 | 1 | → | 1 |

Ideally, each case situation is to be compared with each other case situation, exactly once, for the purpose of computing the global weight vector, W. The number of comparisons here is m−1+m−2+ . . . +2+1, or $$\frac{m(m-1)}{2},$$

which is $O(m^2)$ on a serial machine. This is only tractable for limited values of m. However, an excellent heuristic, for reducing the order of magnitude of comparisons on large case bases without significantly reducing the quality of results, is to compare the ciel (square root of the number of category members) with that defining number of members in each category including its own, though compared cases must be distinct. This is particularly useful for supporting the evolution of new features because it trades the time required for an exact evaluation of the weights for an (initial) rough estimation of any new features worth—allowing many more candidate features to be explored.

Once the feature set is stable, if ever, the full serial $O(m^2)$ category comparisons may be resumed. If m parallel processors can be utilized, then the runtime complexity here can be reduced to O(m). This is certainly tractable, where we define tractability based on an efficient sort executing on a serial machine (e.g., MergeSort having average and worst case times of O(N log N)).

The count of comparisons is made in order from the logical head, since these are the most recently acquired/fired cases and thus are intrinsically the most valuable based on temporal locality. For example, in Table 2, cases $c_1$ and $c_4$ are members of the first category dependency and cases $c_2$ and $c_3$ are members of the second category dependency. Thus, $c_1$ is compared against $$\lceil \sqrt{2} \rceil = 2$$

members of its dependency category as well as two members of the second dependency category. Note that when a category member is being compared against its own category, the initial category member may be counted towards the computed limit in the number of comparisons (though skipped when i=j). Furthermore, if each category is dynamically linked based on order from the logical head so that one need not traverse other category members to get to the next member of the same category and each such category maintains a pointer to the next category in order, then, the number of comparisons is $$\lceil\sqrt{m-1}\rceil + \lceil\sqrt{m-2}\rceil + \ldots + \lceil\sqrt{2}\rceil + 1,$$

which is O(m) on a serial machine. (In practice, this is not too difficult to accomplish using two passes through the case base, or O(m) extra storage.) If m parallel processors can be utilized, then the runtime complexity can be reduced to O(log m). If $m^2$ parallel processors can be utilized, then this can be reduced to O(c), or constant time. Naturally, the use of $m^2$ parallel processors would only be practical for limited values of m.

Returning to the example in Table 2, $c_1$ will be compared against $c_2$, then against $c_3$, and next against $c_4$. Then, $c_2$ will be compared against $c_3$, then against $c_4$. Finally, $c_3$ will be compared against $c_4$. Note that $c_i$ is not compared against $c_i$ because this would serve to distort the resultant weights towards uniformity. Uniformity vies against variable (feature) selection. Also, the evolution of the weights is context free in terms of other weights. However, it is actually context sensitive because predicted dependency categories found to be in error are re-acquired as new cases having correct dependencies. The situational part of these new cases defines a new well for matching similar cases. Absolute values are not raised to any power on account of the availability of Boolean features, whose differences are immutable under any power. This also provides for faster computation as the power function is relatively slow in comparison with the arithmetic operators.

If the two situations belong to distinct categories (d), we want to assign maximal weights, $w_j$, to the situational variables that are the most quantitatively different. However, if the two situations belong to the same category (d), we want to assign maximal weights, $w_j$, to the situational variables that are the most quantitatively the same. In this second case, all of the non-asterisk variables need to be subtracted from one, in order to weight the variables that are most similar most heavily. The process is depicted in FIG. 6.

First, compare $c_1$ against $c_2$. These two situations belong to distinct categories (d). Going through $ind_1$ to $ind_4$ in Table 2 for cases $c_1$ and $c_2$, computing $|c_1-c_2|$ gives $w_1$ through $w_4$ as: $|0.333-0.5|=0.167$, $|0-1|=1$, $|0.125-0.25|=0.125$, $|1-0|=1$. We note that the qualitative features are at least as important as any other situational variable. This is evidenced by their more extreme absolute values relative to the non-Boolean situational variables. Here, W=(0.167, 1, 0.125, 1).

Next, compare $c_1$ against $c_3$. These two situations belong to distinct categories (d). Going through $ind_1$ to $ind_4$ in Table 2 for cases $c_1$ and $c_3$, computing $|c_1-c_3|$ gives $w_1$ through $w_4$ as: *, *, $|0.125-0.375|=0.25$, $|1-0|=1$. Here, W=(*, *, 0.25, 1).

Next, compare $c_1$ against $c_4$. These two situations belong to the same category (d). Going through $ind_1$ to $ind_4$ in Table 2 for cases $c_1$ and $c_4$, computing $|c_1-c_4|$ gives $w_1$ through $w_4$ as: $|0.333-0.167|=0.166$, $|0-1|=1$, $|0.125-0.25|=0.125$, $|1-1|=0$. Here, W=(0.834, 0, 0.875, 1).

Next, compare $c_2$ against $c_3$. These two situations belong to the same category (d). Going through $ind_1$ to $ind_4$ in Table 2 for cases $c_2$ and $c_3$, computing $|c_2-c_3|$ gives $w_1$ through $w_4$ as: *, *, $|0.25-0.375|=0.125$, $|0-0|=0$. Here, W=(*, *, 0.875, 1).

Next, compare $c_2$ against $c_4$. These two situations belong to distinct categories (d). Going through $ind_1$ to $ind_4$ in Table 2 for cases $c_2$ and $c_4$, computing $|c_2-c_4|$ gives $w_1$ through $w_4$ as: $|0.5-0.167|=0.333$, $|1-1|=0$, $|0.25-0.25|=0$, $|0-1|=1$. Here, W=(0.333, 0, 0, 1).

Next, compare $c_3$ against $c_4$. These two situations belong to distinct categories (d). Going through $ind_1$ to $ind_4$ in Table 2 for cases $c_3$ and $c_4$, computing $|c_3-c_4|$ gives $w_1$ through $w_4$ as: *, *, $|0.375-0.25|=0.125$, $|0-1|=1$. Here, W=(*, *, 0.125, 1).

Now, compute the normalized weight vectors. First, the raw computed weight vectors, W, are given in Table 3. Next, each $c_{i,j}$ is normalized going across for j=1 to n. Table 4 presents the results. The computed weights are then summed and divided by the number of non-asterisked, situational variables and normalized to yield the final normalized four weights.

Suppose the situational context is defined by $c_1$ in Table 2. The correct dependency category is 1. Let's see how this might be predicted. First, let us compare $c_1$ against $c_1$. The raw context, $c_1$=(10, 0, 5, 1). Next, we perform a column-normalization by dividing the non-Boolean variables by the previously saved column sums. Thus, $c_1$=($^{10}/_{30}$, 0, $^{5}/_{40}$, 1)= (0.333, 0, 0.125, 1). Going across $w_1$ to $w_4$ in Table 2 for $c_1$, $|c_1-c_1|$ is computed as: $|0.333-0.333|=0$, $|0-0|=0$, $|0.125-0.125|=0$, $|1-1|=0$. Thus, match (i=1)=0, which is minimal and thus is correctly matched. (Note that skewed averages are still necessary if non determinism is allowed. Here however, the case situation, $c_1$, occurs only once in Table 2—insuring that the correct dependency is d=1).

Next, compare the situational context=(10, 1, 5, 0) against the four cases in Table 2 to find the best match and thus the predicted value for the dependency. Boolean matches are more significant and thus we would expect the dependency category to be two here.

Compare this situational context against $c_1$. Next, we perform a column-normalization by dividing the non-Boolean variables by the previously saved column sums. Thus, $c_1$= ($^{10}/_{30}$, 1, $^{5}/_{40}$, 0)=(0.333, 1, 0.125, 0). Going across $w_1$ to $w_4$ in Table 2 for $c_1$, $|c_1-\text{context}|$ is computed as: $|0.333-0.333|=0$, $|0-1|=1$, $|0.125-0.125|=0$, $|1-0|=1$. Thus,

TABLE 3

| Wts: | $w_1$ | $w_2$ | $w_3$ | $w_4$ | Init. Σ |
|---|---|---|---|---|---|
| $c_{1,2}$ | 0.167 | 1 | 0.125 | 1 | 2.292 |
| $c_{1,3}$ | * | * | 0.25 | 1 | 1.25 |
| $c_{1,4}$ | 0.834 | 0 | 0.875 | 1 | 2.709 |
| $c_{2,3}$ | * | * | 0.875 | 1 | 1.875 |
| $c_{2,4}$ | 0.333 | 0 | 0 | 1 | 1.333 |
| $c_{3,4}$ | * | * | 0.125 | 1 | 1.125 |

TABLE 4

| Wts: | $w_1$ | $w_2$ | $w_3$ | $w_4$ | Fin. Σ |
|---|---|---|---|---|---|
| $c_{1,2}$ | 0.0729 | 0.4363 | 0.0545 | 0.4363 | 1.0 |
| $c_{1,3}$ | * | * | 0.2 | 0.8 | 1.0 |
| $c_{1,4}$ | 0.3079 | 0 | 0.323 | 0.3691 | 1.0 |
| $c_{2,3}$ | * | * | 0.4667 | 0.5333 | 1.0 |
| $c_{2,4}$ | 0.2498 | 0 | 0 | 0.7502 | 1.0 |
| $c_{3,4}$ | * | * | 0.1111 | 0.8889 | 1.0 |
| Σ | 0.6306 | 0.4363 | 1.1553 | 3.7778 | 6.0 |
| Avg: | 0.2102 | 0.1454 | 0.1926 | 0.6296 | 1.1778 |
| Norm: | 0.1785 | 0.1234 | 0.1635 | 0.5346 | 1.0 |

$$\text{match}(1) = \frac{0.1785(0) + 0.1234(1) + 0.1635(0) + 0.5346(1)}{4} = 0.1645.$$

The denominator is four here because none of the situational variables union the context, in Table 2, has an asterisk and thus are all participating.

Next, compare this situational context against $c_2$. Going across $w_1$ to $w_4$ in Table 2 for $c_2$, $|c_2\text{-context}|$ is computed as: $|0.5-0.333|=0.167$, $|1-1|=0$, $|0.25-0.125|=0.125$, $|0-0|=0$. Thus, $$\text{match}(2) = $$
$$\frac{0.1785(0.167) + 0.1234(0) + 0.1635(0.125) + 0.5346(0)}{4} = 0.0126.$$

Next, compare this situational context against $c_3$. Going across $w_1$ to $w_4$ in Table 2 for $c_3$, $|c_3\text{-context}|$ is computed as: *, *, $|0.375-0.125|=0.25$, $|0-0|=0$. Thus, $$\text{match}(3) = \frac{0.1785(0) + 0.1234(0) + 0.1635(0.25) + 0.5346(0)}{2} = 0.0204.$$

The denominator is two here because a total of two situational variables union the context, in Table 2, have asterisks and thus are not participating—being substituted for by zero above. Four situational variables reduced by two non-participating ones, leaves two participating situational variables.

Next, let us compare this situational context against $c_4$. Going across $w_1$ to $w_4$ in Table 2 for $c_4$, $|c_4\text{-context}|$ is computed as: $|0.167-0.333|=0.166$, $|1-1|=0$, $|0.25-0.125|=0.125$, $|1-0|=1$. Thus, $$\text{match}(4) = $$
$$\frac{0.1785(0.166) + 0.1234(0) + 0.1635(0.125) + 0.5346(1)}{4} = 0.1462.$$

Next, we compute the uniform skew value for each category. $c_1$ and $c_4$ have $d=1$ and $c_2$ and $c_3$ have $d=2$. Thus, match (category$_1$)=(match (1)+match (4))/2=(0.1645+0.1462)/2=0.1554. Match (category$_2$)=(match (2)+match (3))/2=(0.0126+0.0204)/2=0.0165. The second category (i.e., $d=2$) is the better selection by a factor of almost ten. Here, the minimum match (i)−squelch=0.0165−0.1=−0.0835<−squelch/2 and thus we would be "very sure" of it being the correct category. Also, the first category is above the set squelch of 0.1 and thus we would be "very unsure" of it being the correct category.

Had the 3-2-1 skew been used instead of the uniform skew, then the first member of each category would have been weighted more heavily, since it is closer to the logical head. The 3-2-1 skew only considers an element in positional relation to elements in the same category. The 3-2-1 skew for two elements is (⅔, ⅓). Thus, match (category')=(0.6667*0.1645+0.3333*0.1462)=0.158. Match (category$_2$)=(0.6667*0.0126+0.3333*0.0204)=0.015. Here, the use of the 3-2-1 skew has once again selected the second category (i.e., $d=2$), as desired. We are slightly more sure of it being the correct category under the 3-2-1 than uniform skew because 0.015−0.1=−0.085<−0.0835<−squelch/2.

Suppose however that it was learned that the correct dependency for the context was not $d=2$, but rather something else—say $d=3$, without loss of generality. Table 5 shows the resulting logical ordering of the updated case base. (Note that Table 5 would depict a non deterministic case base if the context was an exact match for an existing situation, but the associated action differed.) If this table was limited to the storage of four cases, then case $c_5$ would be expunged to make room for case $c_1$. Physical case movement or search is not required. Again, this would involve updating the pointers to a doubly-linked global list.

In Table 5, the global head pointer would be updated to point to case $c_1$ upon acquisition. Case acquisition or firing results in logical movement to create a new list head, where not redundant. The next pointer is updated to point to the previous head, or $c_2$. The next lower case having the same dependency, or case $c_5$, is eventually visited through global traversal. Counts of the number of members having the same dependency are maintained for the computation of the uniform or 3-2-1 skew. Case $c_5$ is last on the global list. Thus, it can be expunged by adding it to the free list and changing the last on the list to point to its immediate predecessor, or case $c_4$. Thus, the tail is updated to point to $c_4$.

Suppose that case $c_4$ were to be fired. It is logically moved to the head of the global list. Thus, the head pointer is set to $c_4$. Case $c_4$s next pointer is set to the previous head, or case $c_1$. Case $c_4$s predecessor's next pointer (case $c_3$) is set to point to case $c_4$s successor (case $c_5$).

Notice how the chance of generating an erroneous dependency (and its associated possibility) decreases with each case acquisition—given a segmented and relatively stable domain. This is because each case situation induces a proximal matching field for every context. The utility of this matching field is proportionate to the combined degree to which the situational variables were discriminators during training. This completes our example of case acquisition.

Next, consider the situational variables, ind$_j$. Again, using m parallel processors, a runtime complexity of $O(\log m)$ is achievable. This is very fast and such speed can be put to good use in the evolution of new and better features. Table 4 shows the weights, $W=(0.1785, 0.1234, 0.1635, 0.5346)$. In order of non-increasing significance they are $w_4$, $w_1$, $w_3$, and $w_2$. Observe that despite the missing data for the first two weights for one case (i.e., $c_3$ in Table 2), $w_1$ is not among the first two weighted-features to be replaced. $w_2$ is the least-significant non-zero weighted-feature, or the first to be replaced. Zero-valued weights need time to compute at least one comparative evaluation before being adjudicated. We have seen that missing data does not affect the value assigned to a weight, as desired. The capability to handle this situation is generally required for feature evolution.

TABLE 5

| Wts: | $w_1$ | $w_2$ | $w_3$ | $w_4$ | | Dep. |
|---|---|---|---|---|---|---|
| Ind: | ind$_1$ | ind$_2$ | ind$_3$ | ind$_4$ | → | d |
| Feature: | NB | Bool | NB | Bool | | |
| $c_1$ | 0.333 | 1 | 0.125 | 0 | → | 3 |
| $c_2$ | 0.333 | 0 | 0.125 | 1 | → | 1 |
| $c_3$ | 0.5 | 1 | 0.25 | 0 | → | 2 |
| $c_4$ | * | * | 0.375 | 0 | → | 2 |
| $c_5$ | 0.167 | 1 | 0.25 | 1 | → | 1 |

One evolutionary strategy is to run numerous distinct tables, having n situational variables each, in parallel. Each table holds predominantly distinct situational variables (features), though limited duplication is permitted to accelerate feature generation time. After all of the variables have received computed weights, the n greatest weights, and associated distinct variables (features) are concatenated in one table and renormalized. At least one non-Boolean situational variable containing no asterisks is required in the final table. Care must be exercised that no feature is "dangling"—due to reference to a missing situational variable(s), or even other feature(s).

The requirement to compute new normalized elements requires that the original data (see Table 1) be the starting point each time—along with the appropriate sums (i.e., in view of a change in the included fields). This strategy is most useful where many parallel/distributed processors are available. A stable sort, such as the n-way MergeSort, is used to sort the weight vectors. A stable sort maintains the relative order of records with equal values. This is important for feature evolution. Here, new situational features are inserted at the right. Thus, in the event of a tie, preexisting situational features will be more highly valued, since they have survived the longer test of time. Again, MergeSort has best and worst case times of O(N log N) and MergeSort's best case takes about half as many iterations as its worst case.

If no situational variable that is referenced by a feature(s) is allowed to be replaced and no feature that is referenced by another feature(s) is allowed to be replaced, then a second serial-processor strategy may be more efficient. The (non-zero lowest-weight) non-referenced variables and features can be replaced (or augmented) with new variables and/or features. To be replaced, the non-referenced variable or feature must have a weight, which is less than the average weight of all variables and features (except itself) having non-zero weights. Thus, better results can be expected if the number of features referencing other features is minimized (or eliminated). This is necessary to insure that relatively valuable non-referenced variables are not lost.

Here, a few of the non-zero lowest-weight features can be found using a single-pass algorithm, which is O(n) on a sequential machine. The computation of Table 6 follows the same process as was illustrated for the computation of Table 3. The sums are unaffected. Tables 6 and 7 contain a replaced feature, $ind_2$. The new feature, though far from perfect, evidences better discrimination than the one it replaced. The theoretical ideal weight vector, W, would have minimal cardinality such that all $w_j$ are equal. Ideally, a single situational variable would suffice to determine the dependency category. Table 7 computes the new weight vector, W=(0.1163, 0.2995, 0.1411, 0.4431).

TABLE 6

| Wts: | $w_1$ | $w_2$ | $w_3$ | $w_4$ | Init. Σ |
|---|---|---|---|---|---|
| $c_{1,2}$ | 0.167 | 1 | 0.125 | 1 | 2.292 |
| $c_{1,3}$ | * | * | 0.25 | 1 | 1.25 |
| $c_{1,4}$ | 0.834 | 1 | 0.875 | 1 | 3.709 |
| $c_{2,3}$ | * | * | 0.875 | 1 | 1.875 |
| $c_{2,4}$ | 0.333 | 1 | 0 | 1 | 2.333 |
| $c_{3,4}$ | * | * | 0.125 | 1 | 1.125 |

TABLE 7

| Wts: | $w_1$ | $w_2$ | $w_3$ | $w_4$ | Fin. Σ |
|---|---|---|---|---|---|
| $c_{1,2}$ | 0.0729 | 0.4363 | 0.0545 | 0.4363 | 1.0 |
| $c_{1,3}$ | * | * | 0.2 | 0.8 | 1.0 |
| $c_{1,4}$ | 0.2249 | 0.2696 | 0.2359 | 0.2696 | 1.0 |
| $c_{2,3}$ | * | * | 0.4667 | 0.5333 | 1.0 |
| $c_{2,4}$ | 0.1428 | 0.4286 | 0 | 0.4286 | 1.0 |

TABLE 7-continued

| Wts: | $w_1$ | $w_2$ | $w_3$ | $w_4$ | Fin. Σ |
|---|---|---|---|---|---|
| $c_{3,4}$ | * | * | 0.1111 | 0.8889 | 1.0 |
| Σ | 0.4406 | 1.1345 | 1.0682 | 3.3567 | 6.0 |
| Avg: | 0.1469 | 0.3782 | 0.1780 | 0.5595 | 1.2626 |
| Norm: | 0.1163 | 0.2995 | 0.1411 | 0.4431 | 1.0 |

Figure 8:
FIG. 8 shows a diagram illustrating a simple weather features schema in accordance with the Case-Based Reasoning System Using Normalized Weight Vectors.
Figure 9:
FIG. 9 shows a diagram illustrating an instance of the simple weather features schema shown in FIG. 8.

Table 8 shows the acquisition of a new case by our arbitrary case base as set forth in Table 1. This case includes a new Boolean feature, $ind_5$. Notice that this feature could not be computed for any but the new case due to the unavailability of data. Nevertheless, the system is designed so that the computed weight, $w_5=0$, can co-exist with the other weights, W, despite the single data point. In fact, having few data points (e.g., the square root of the number of category members), turns out to be an advantage for the evolution of new features. This is because having few data points supports a more uniform coverage of the feature search space. Features are generated through the instantiation of schema, which involve situational variables and relational operators. Features may also be taken from case-base dependencies. A simple weather features schema 600 is shown in FIG. 8, while an instance 700 of schema 600 is shown in FIG. 9.

TABLE 8

| Wts: | $w_1$ | $w_2$ | $w_3$ | $w_4$ | $w_5$ | Dep. |
|---|---|---|---|---|---|---|
| Ind: | $ind_1$ | $ind_2$ | $ind_3$ | $ind_4$ | $ind_5$ | |
| Feature: | NB | Bool | NB | Bool | Bool | → d |
| $c_1$ | 20 | 1 | 20 | 0 | 1 | → 2 |
| $c_2$ | 10 | 0 | 5 | 1 | * | → 1 |
| $c_3$ | 15 | 1 | 10 | 0 | * | → 2 |
| $c_4$ | * | * | 15 | 0 | * | → 2 |
| $c_5$ | 5 | 1 | 10 | 1 | * | → 1 |

Through careful schema definition and instantiation, many features can be generated for exploration. Note that it is better to generate more schemas than rely on schema instances to cover the schema search space. This is because having a greater number of schemas embodies greater knowledge, which serves to constrain the search space. Schema definition languages may be written. They can even be used to write schemas that write schemas—much like a Van Wijngaarden two-level grammar. Given the availability of high-speed massively parallel computers, such problems as mapping massive data to knowledge are, in principle, solvable using the methodology defined herein.

Again, fired dependency categories can serve as situational features for another case base—including itself. For example, if rain is predicted, it is more likely that I will take an umbrella. Here, the prediction of rain is a category dependency for one case base and serves as a feature for another. Similarly, if I see others with umbrellas, it is more likely that rain is predicted. This heterarchical interaction, among distributed case base segments, defines a generalized and-or graph (GAG). The GAG is searched for dependencies that can serve as situational features for its constituent subgraphs (segmented case bases). A self-referential network is so defined. GAGs are theoretically equivalent to Type 0 grammars. It follows that they can solve, in principle, any solvable problem for which there is a symbolic representation—though they are necessarily subject to essential incompleteness.

The GAG provides an executable model of brain function and post-tetanic potentiation (neural learning). Seemingly random firing patterns, observed to occur in the brain, may simply be a random/symmetric search for dependencies to serve as features. That is, successful situational features are more likely to be taken from segmented case base dependencies, where they were previously discovered. Here, new cases and segmented bases can be formed through the association of triggered dependency categories and the most-recent distinct actions.

Figure 7:
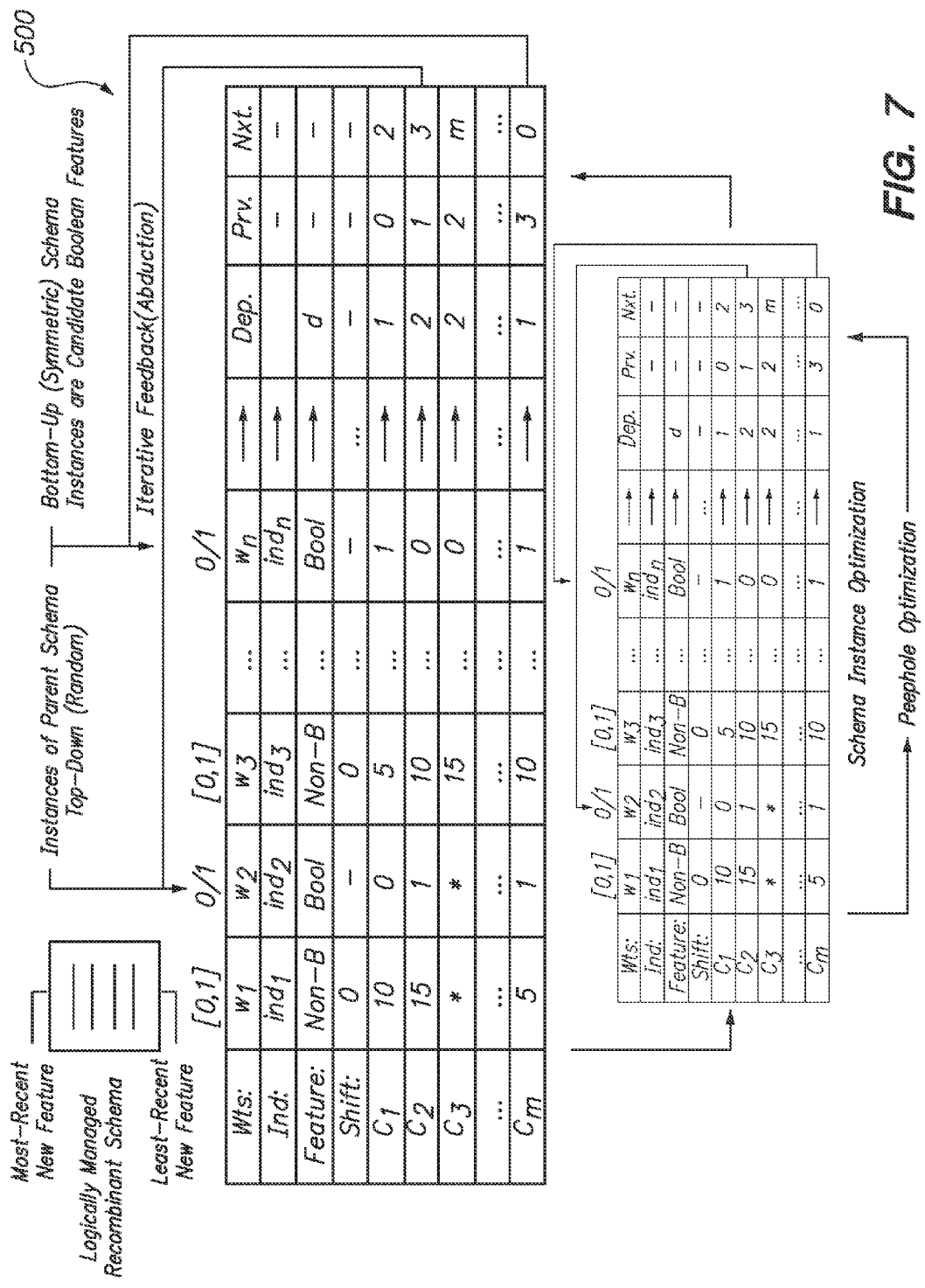
FIG. 7 shows a diagram illustrating the evolution of weighted features in accordance with the Case-Based Reasoning System Using Normalized Weight Vectors.

Thus, if I see others with umbrellas, it is more likely that I will take an umbrella. Such modus ponens is theoretically impossible without the use of symbolic category dependencies and symbolic features. Thus, this simple example could not be realized using neural networks. It follows that general intelligent learning systems can be constructed using massively parallel networks, symmetric schema definition languages, and the principles that serve as the basis for this patent disclosure. FIG. 7 looks ahead and depicts the interrelationship among top-down and bottom-up schema instantiation and optimization.

Below is an example of an algorithmic codification of one embodiment of the method disclosed herein.

1. Define Tripwire:
2. /* This algorithm evolves knowledge from data suitable for use in a tripwire alert system.
3. Cases capture one or more salient (or even not so relevant) independent variables and associate these situations (features) with some action (dependency). */
4. A hash table lookup may be used to convert concepts to integers and real numbers. Numerical assignments must be in proportion to each other (see narrative). All non-Boolean vectors so produced may not have any non-positive elements.
5. Shift values are maintained for each non-Boolean variable. These shifts are initialized to one minus the minimum field values, or zero—whichever is greater. If the resultant shift exceeds zero, each non-Boolean variable is initially shifted up by the computed shift value. Whenever a new contextual or situational variable has value less than or equal to the negation of its corresponding shift, then the shift takes the absolute value of that variable plus one. Non-Boolean variables not previously shifted (e.g., the context) will be shifted up by that amount, while all previously shifted ones (e.g., field values) will be shifted up by the values new—old shifts. Whenever a case is expunged, if the expunged non-Boolean variables have values of one, then new field minimums are found (i.e., an O(m) process) and if their values exceed one, the associated shifts and the previously shifted variables are both reduced by the amount that those values exceed one. Thus, all non-Boolean non-asterisk variables will have value of at least one.
6. At least one non-Boolean situational variable containing no asterisks is required. It may be used to compute one or more Boolean situational variables. The range of the non-Boolean situational variables is defined by positive real numbers.
7. An arbitrary number of Boolean variables (i.e., features) may be included. They are defined by values of zero or one. Features may be evaluated by domain-specific code, by database query, and where being human bound is acceptable, by user questions.
8. A case is defined by I→d, where I is a set of situational variables (Boolean features) and d is an associated domain-specific dependency—one per case. Each member of I is typecast as Boolean or non Boolean. Each member of I is assigned a normalized weight, $w_j$, such that $\Sigma w_j = 1.0$. New weights are initialized to zero.
9. An asterisk, "*", represents a situational variable whose value is unknown, or was not recorded.
10. Cases are acquired at the logical head, moved to the logical head when fired, and expunged from the logical tail when necessary to release space.
11. The nearness of a pair of cases, $c_i$ and $c_j$, where the context is taken as $c_j$, is given by $$\text{match}(i) = \frac{\sum_{k=1}^{n} w_k |c_{i,k} - c_{j,k}|}{|\text{participating situational variables}|}, i \neq j.$$

It follows that since all weights and participating variable differences are normalized, match(i)∈[0,1]. A participating situational variable is one that does not include an "*" in its field. If there are no such fields, then the pair of cases is omitted from the computation. If there are no such pairs of cases, then the match cannot be computed and thus is undefined.

12. In general, a uniform or 3-2-1 skew is used. The latter is useful for domains where the value of the data deteriorates in linear proportion to its time of collection—valuing more recent data, more highly. Here, the ith map from the head has a weight of for $$\frac{2(d-i+1)}{d(d+1)},$$

i=1, 2, . . . d. The evaluation of the members of a dependency category is the contiguous (i.e., where position is relative to members of the same category and is otherwise ignored) weighted sum of its constituent elements.

13. The dependency category selected to be fired will be the weighted match (i), which has a minimal category value. In the event of a tie, the dependency averaging (i.e., substituting the case dependencies relative position from the logical head for its match (i) value), nearer (at) the logical head of the case base is selected as the winner as a result of temporal locality. The single case dependency, which is nearer (at) the logical head, is selected as the winner in the event of a second tie.
14. Set squelch≥0. The most appropriate value for the squelch may be determined experimentally and is domain specific.
15. L1: The ranges of non-Boolean variables are normalized using double-precision computations. There must be at least one non-Boolean vector containing no asterisks.
16. Save the sums of non-Boolean variables (asterisks are skipped) for the subsequent normalization of any context.
17. Each case situation is to be compared with each other (i.e., $c_i$ with $c_j$ such that 0<i<j, using an absolute ordering for m (m−1)/2 case pairings) if the feature space is stable and sufficient processor power is available. Otherwise, compare the ciel (square root of the number of category members) with that defining number of members in each category—including its own, though compared cases must be distinct. Here, we have O(m) case pairings (i.e., $c_i$ with $c_j$ such that 0<i≤j, and $$j \leq \lceil \sqrt{|d_c|} \rceil,$$

where $d_c$ represents the dependency categories using a relative ordering and only distinct cases are to be compared). The paired category members are visited contiguously from the logical top until the limiting number is reached.

18. If the cases to be compared belong to distinct categories, maximal weights are assigned to the situational variables that are the most quantitatively different. Thus, the $w_{p,k} \leftarrow |c_{i,k} - c_{j,k}|$, $i \neq j$. If either $c_{i,k}$ or $C_{j,k}$ is an asterisk, then $w_{p,k}$ is defined to be an asterisk.

19. Otherwise, the cases to be compared belong to the same category. Here, maximal weights are assigned to the situational variables that are the most quantitatively the same. Thus, the $w_{p,k} \leftarrow 1.0 - |c_{i,k} - c_{j,k}|$, $i \neq j$. If either $c_{i,k}$ or $c_{j,k}$ is an asterisk, then $w_{p,k}$ is defined to be an asterisk.

20. If each case situation is compared with each other, then each weight vector, $w_{p,k}$, will be comprised of $p=m(m-1)/2$ elements. Otherwise, each weight vector will be comprised of $p=O(m)$ elements.

21. Next, normalize each of p rows of weights for $w_{p,k}$, where $k=1$ to n. This is accomplished by replacing each $w_{p,k}$ by $$\frac{w_{p,k}}{\sum_{k=1}^{n} w_{p,k}}.$$

Note that asterisks are not replaced and do not contribute to the summation.

22. Next, find the n weight vector averages, $$w_{u,k} = \frac{\sum_{p} w_{p,k}}{|\text{participating situational variables}|}.$$

A participating situational variable is one that does not include an "*" in its field. Again, if there are no such fields, then the pair of cases is omitted from the computation. If there are no such pairs of cases, then the match cannot be computed and thus is undefined.

23. Next, normalize $w_{u,k}$, where $k=1$ to n. This is accomplished by replacing each $w_{u,k}$ by $$\frac{w_{u,k}}{\sum_{k=1}^{n} w_{u,k}}.$$

This yields the final weights, $w_k$.

24. In theory, re-compute the weights, $w_k$, whenever a case is acquired, fired (i.e., using the square-root speedup method only), or expunged, and/or a feature is acquired/expunged by going to L1. In practice, using a service-oriented architecture (SOA), such transfer of control may only occur during periods of relatively low server utilization (e.g., nights). Even then, it must be interruptible. Use the ciel of the square root of the number of category member comparisons method for an order of magnitude speedup (e.g., for the evolution of new features). Otherwise, given sufficient processor power, each case situation may be compared with each other.

25. Next, find the predicted dependency category for a context. First, perform a column-normalization by dividing the non-Boolean contextual variables by the previously saved column sums.

26. For each of m cases, compute $$\text{match}(i) = \frac{\sum_{k=1}^{n} w_k |c_{i,k} - \text{context}_k|}{|\text{participating situational variables}|}.$$

Note that here the context can affect the number of participating situational variables. Non-participating situational variables are substituted for by zero in this equation.

27. If the uniform skew was selected, for each dependency category, d, calculate the number of members in a dependency category, or $|d|$. Then, $$\text{match}(d) = \sum_{i \in d}^{|d|} \frac{\text{match}(i)}{|d|}.$$

28. If the 3-2-1 skew was selected, for each dependency category, d, calculate the number of members in a dependency category, or $|d|$. Then, $$\text{match}(d) = \sum_{i \in d}^{|d|} \frac{2(|d| - i + 1)}{|d|(|d| + 1)} \text{match}(i'),$$

where the values of i are contiguous for the computation of the 3-2-1 skew (e.g., for $|d|=4$, $i=1, 2, 3, 4$—starting at the logical head), though match (i') is taken for the four dependency category members and thus i' is not necessarily contiguous though in bijective correspondence with i.

29. Output, "I'm qualifier of the correct action." Let, difference=minimum match (d)–squelch. Any difference<–squelch/2 is associated with the qualifier, "very sure". Any –squelch/2≤difference≤squelch/2 is associated with the qualifier, "somewhat sure". Any squelch/2<difference≤squelch is associated with the qualifier, "somewhat unsure". Finally, any squelch≤difference is associated with the qualifier, "very unsure". The computed value, match (d), may also be output.

30. The correct action dependency (d) will be paired with the context and acquired as a new case, at the earliest opportunity, if the dependency should prove to be incorrect. This dependency may or may not comprise a new action category. The logical tail (LRU'd member) of the case base may be expunged, as necessary, to make room for the new case acquisition, which may be non deterministic (i.e., the selected modalilty). If the correct action dependency (d) is not known, then the paired action will be set to, "Unknown". This is necessary to prevent otherwise correct near cases from being unnecessarily expunged, which would occur if this unknown case were expunged. However, the user may ask for a suggestion. This mode iteratively takes the next highest-valued category computed for match (d) and presents its action to the user as a suggestion. This may not result in a local change of action, but if the user should agree with the suggested category, then the previously unknown category is set to the agreed category.

31. Non redundant correct (non-deterministic) cases are acquired at the logical head of the case base. The logical ordering involves updating the pointers to a doubly-linked global list of cases and a free list, as well as list head and list tail variables. (The maintenance of linked lists is common to computer science, was highlighted in the narrative section, and thus is not exemplified here.) (If a deterministic base is desired, then the previously acquired non-deterministic case (there can be at most one) is expunged.) Any otherwise identified incorrect cases are expunged under any methodology.

32. Feature Evolution Strategy One: Run numerous distinct tables, having n situational variables each, in parallel. Each table holds predominantly distinct situational variables (features), though limited duplication is permitted to accelerate feature generation time. After all of the variables have received computed weights, the n greatest weights, and associated distinct variables (features) are concatenated in one table and renormalized. At least one non-Boolean situational variable containing no asterisks is required in the final table. Care must be exercised that no feature is "dangling"—due to reference to a missing situational variable(s), or even other feature(s). The requirement to compute new normalized elements requires that the original data be the starting point each time—along with the appropriate sums (i.e., in view of a change in the included fields). This strategy is most useful where many parallel/distributed processors are available. A stable sort, such as the n-way MergeSort (Appendix II), is used to sort the weight vectors. New situational features are inserted at the right. Thus, in the event of a tie, preexisting situational features will be more highly valued, since they have survived the longer test of time.

33. Feature Evolution Strategy Two: If no situational variable that is referenced by a feature(s) is allowed to be replaced and no feature that is referenced by another feature(s) is allowed to be replaced, then a second serial-processor strategy may be more efficient. The (non-zero lowest-weight) non-referenced variables and features can be replaced (or augmented) with new variables and/or features. To be replaced, the non-referenced variable or feature must have a weight, which is less than the average weight of all variables and features (except itself) having non-zero weights. We will not allow features to reference other features in order to obtain better results. Here, a few of the non-zero lowest-weight features can be found using a single-pass algorithm, which is O(n) on a sequential machine. New normalized elements will be computed. This requires that the original data be the starting point—along with new sums.

34. Using careful schema definition and instantiation, many features can be generated for exploration (see FIGS. 2 and 3). Features may also be taken from case-base dependencies in a more complex (self-referential) algorithm (FIG. 4). New cases and segmented bases can be formed through the association of triggered dependencies and most-recent successful actions.

35. It is better to generate more schemas than rely on schema instances to cover the schema search space. This is because having a greater number of schemas embodies greater knowledge, which serves to constrain the search space. Schema definition languages may be written.

36. If server utilization is relatively low, go to L1. Otherwise, answer server demands.

Referring now to FIG. 1, FIG. 1 shows a block diagram of one embodiment of a system 10 that may be used in accordance with the methods described herein. System 10 may include a first computing system 20 and a second computing system 60. System 10 is shown in a networked, multi-processor, distributed computing configuration. It should be recognized that system 10 may include substantially more networked computing systems 20 and 60 than those shown in FIG. 1. Additional computing systems allow for increased learning as system 10 scales upward.

Computing systems 20 and 60 may be substantially similar, and may be configured with the appropriate software modules to perform methods as discussed herein. The term "module" generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. Thus, the use of the term "module" herein, indicates reference to such software modules or implementations thereof. The terms "module" and "software module" can be utilized interchangeably with one another to describe the same element or feature.

The embodiments described herein may be implemented as a series of modules, either functioning alone or in concert with physical electronic and computer hardware devices. Such modules may be utilized separately and/or together locally and/or remotely to form a program product thereof, that may be implemented through signal-bearing media, including transmission media and recordable media. The methods described herein may be implemented as a program product comprised of a plurality of such modules, which can be interactively displayed for a user on a display screen of a data-processing system (e.g., computer). Such interactivity may be provided by a specialized graphical user interface (not shown).

System 20 may include a case base system 30 including a plurality of cases having one or more antecedents 40 and one or more associated consequents 42. Antecedents 40 may be comprised of one or more independent variables that include Boolean and non-Boolean variables. System 30 may further include an optional word base 50. The cases and word base 50 may be stored in memory within computing system 20. Similarly, system 60 may include a case base system 70 including a plurality of cases having one or more antecedents 80 and one or more associated consequents 82. Consequents 82 may comprise a domain specific dependency variable. System 70 may further include an optional word base 90. The cases and word base 90 may be stored in memory within computing system 70.

In operation, user-supplied contexts are input into case base systems 20 and/or 60. The user-supplied contexts may comprise one or more contextual antecedents, such as contextual antecedents 92 and 94, which are compared to the one or more case antecedents, such as 40 or 80, that are stored in the case base.

The cases stored in the case base include case antecedents and case consequents, both of which are previously supplied by a user, either during training of the system or during real-time system operation. A case involving the best match of the case antecedents with the contextual antecedents is then determined. The consequent of the selected case is then displayed to a user, and, if the displayed consequent is not a question, the selected case is moved to the head of the case base, as indicated in FIG. 1. In the event memory constraints occur, least-frequently-used cases are deleted from the tail of the case base, as indicated (or moved to a backup secondary memory device such as an optical jukebox). In some embodiments, in a training mode, the system may display, in addition to the case consequent(s) an explanation of the case antecedent(s) that were matched with the contextual antecedent(s) supplied by the user.

Some general rules that may be implemented into the system and method disclosed herein may include: 1) cases may be learned if the user agrees with the consequent or not—so long as they do not duplicate an existing case, in which case the existing case is simply moved to the head of the queue; 2) cases are moved to the head of the queue so that the most-recently referenced case will break any ties among cases having the same computed possibility and so that the least-recently referenced cases will fall to the tail where they may be expunged with minimal functional loss; 3) consequents that ask a question however are not moved to the head because they are not as valuable as regular cases when (if) case memory fills up; and 4) consequents may be specified as "unknown" for consideration for subsequent specification (or not), when they may become known.

Figure 2:
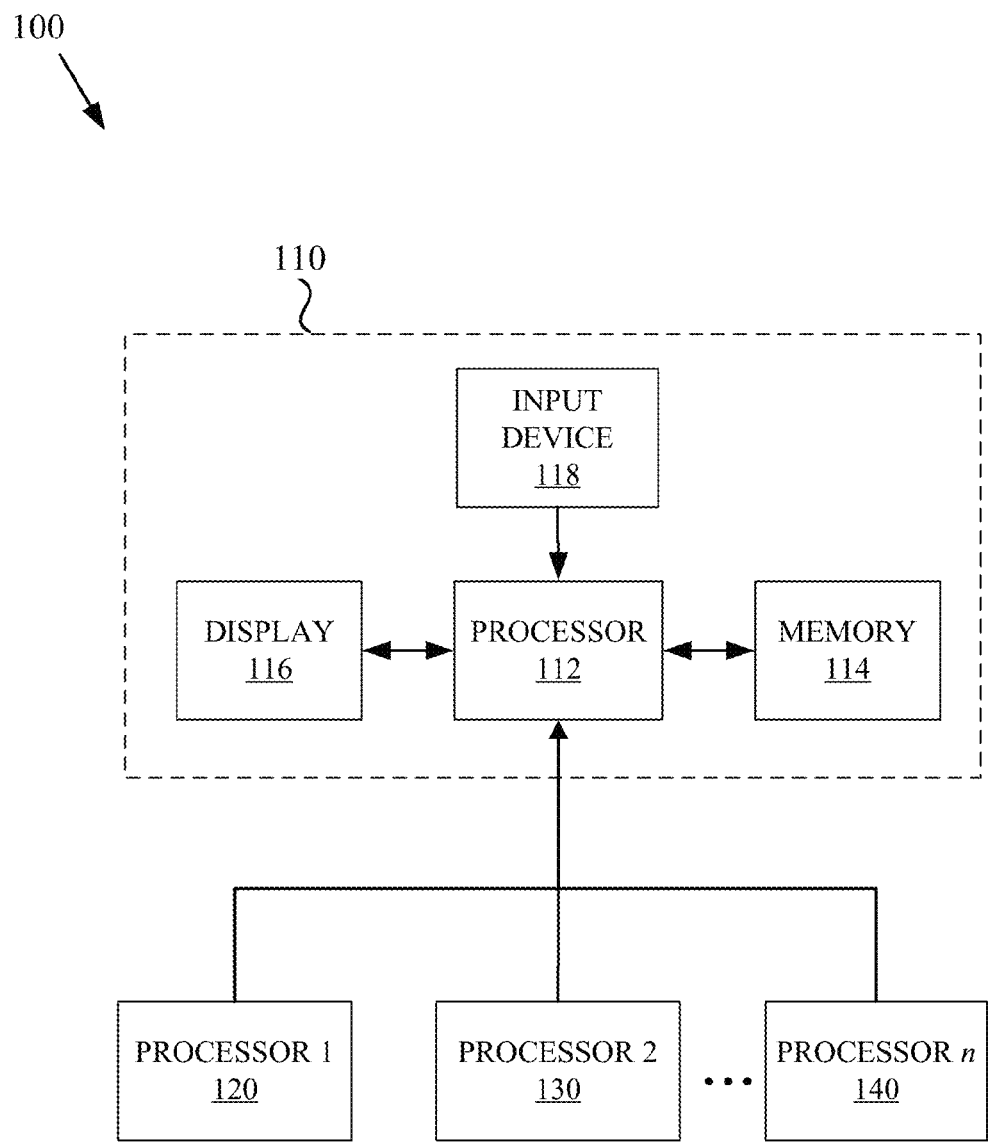
FIG. 2 shows a block diagram of an embodiment of a distributed processor system in accordance with the Case-Based Reasoning System Using Normalized Weight Vectors.

FIG. 2 shows a block diagram of an embodiment of a distributed processor system 100 in accordance with the methods disclosed herein. The speed of a case-based reasoning system can be increased through the use of associative memory and/or parallel (distributed) processors, such as shown in FIG. 2. Furthermore, an increase in speed can be obtained if information stores are subdivided for the case knowledge by domain for threaded parallel processing. This is known as segmenting the domain. Such segmentation can be automatically managed by inferred symbolic heuristics, but this will necessarily introduce much redundancy into the system—albeit brain-like. The idea here is to match the candidate case to be acquired against the dynamic case residing at the head of each segment. This case is acquired by those segments, whose head most-closely (not perfectly) matches it based on their possibilities.

Moreover, it is acquired by all segments whose current head is within $\delta$ of this new case, where $\delta$ is dynamically defined by the minimal possibility differential among case-base heads. However, whenever the computed possibility between the new case and the case-base heads is greater than the current maximum among case-base heads, $\delta$, so that the new case falls outside of existing segments, the case is acquired by creating a new segment (i.e., given sufficient parallel nodes/space)—otherwise, the least-recently—used (LRU) segment is expunged and replaced. Thus, a system, such as system 10 or 100, may be cold-started with a pair of non-redundant segments.

Further, given a system such as system 100, it is possible for one or more computers to chat back and forth with each other if the output of each can serve to augment the input for another. This process is also brain-like because here the cases will acquire knowledge on how to solve a problem (e.g., by way of asking questions)—not just domain-specific knowledge. This respects the mathematical process of randomization. Every consequent (or response to a consequent) may be either terminal or non-monotonic in its action—as determined by whether or not it elicits additional knowledge from the user (or other subsystem) to augment the on-going context. The consequent(s) produced by this iterative feedback process may be corrected, as necessary. This is knowledge amplification because knowledge begets knowledge. That is, knowledge imbued along one path of reasoning becomes subsumed along other paths of reasoning.

Feedback may play a role in the operation of the methods described herein. Feedback takes two forms: 1) consequents may raise questions, the answers to which, supplied by the users, server to augment the context; and 2) the consequents themselves may literally augment the context—again, under user control. The fact that antecedents and consequents can share the same space implies that words for both share the same words table.

Classical set theory does not allow for duplication of elements in the context or antecedent. However, sentential forms are sequence sensitive and thus differ from sets. For example, if I state, "location", you might think of a map; but, if I state, "location, location, location", you might instead think of real estate. Our system must be capable of making use of such sequence in matters of practical feedback. However, contextual duplicate words may not be counted because to do so would proportionately decrease the resultant possibility and thus result in a bad case match. Fortunately, not counting duplicates does not change the complexity of the algorithm. The context length is decreased by one for each such duplicate (i.e., when in default mode). Then, notice that traditionally deleterious cycles (e.g., a→a; a→b, b→a; etc.) become an asset because with the aforementioned feedback comes duplication in the context, which as we've witnessed can beneficially alter sentential semantics. This means that there is no need to hash to detect cycles (using stacked contexts) because such cycles are beneficial. Finally, the allowance for cycles implies that there is no need to copy the context into a buffer to facilitate data entry.

As such, system 100 may include a computer 110 having processors 120, 130, and 140 connected thereto. Computer 110 may include a processor 112, memory 114, display 116, and input device 118, such as a keyboard or mouse. System 100 may be used to provide an increase in computing capacity by allowing processor 112 to coordinate processors 120, 130, and 140 such that maximum processing capabilities are achieved.

Figure 3:
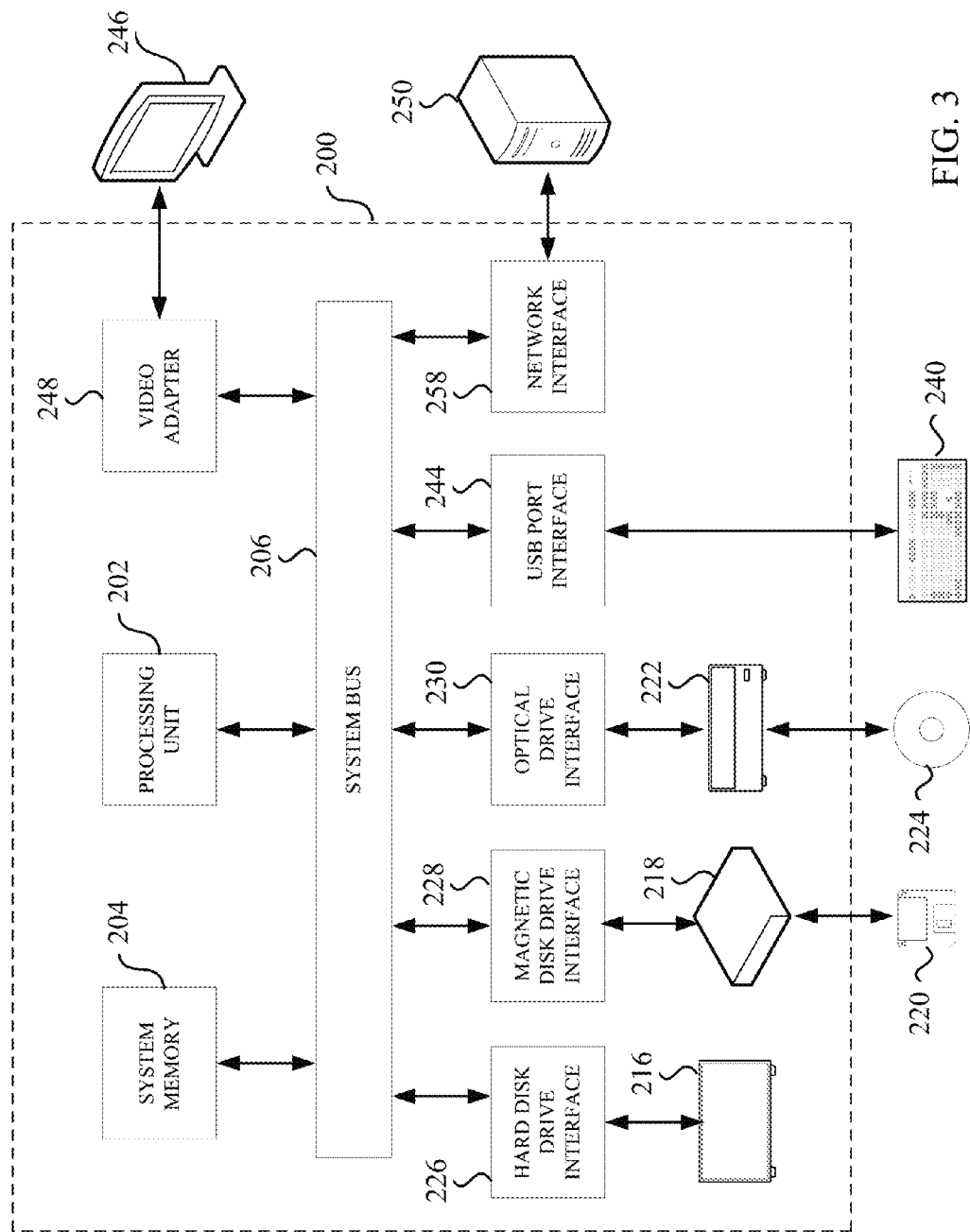
FIG. 3 shows a block diagram of an embodiment of a computing system for implementing and performing a method in accordance with the Case-Based Reasoning System Using Normalized Weight Vectors.
Figure 4:
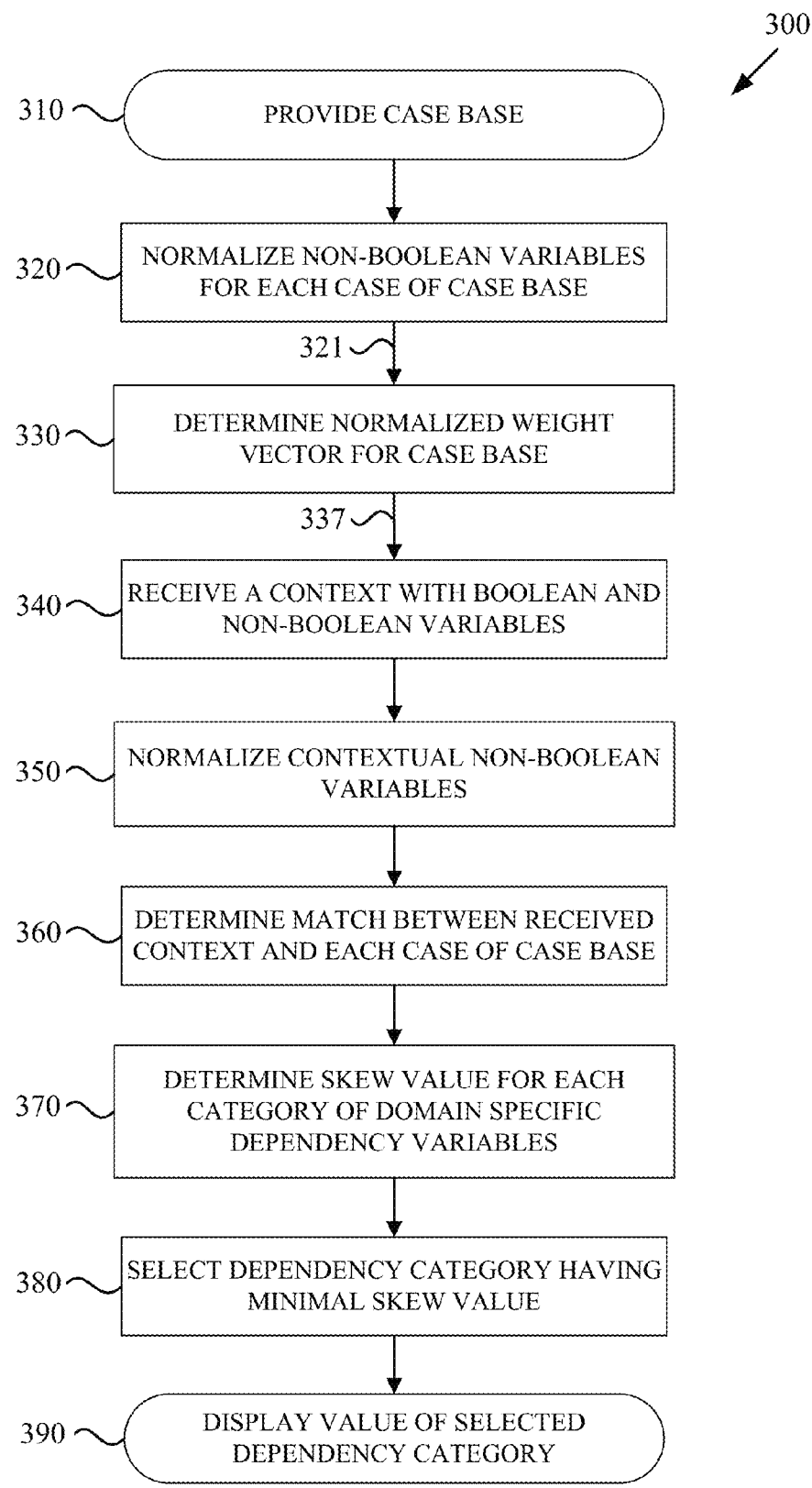
FIG. 4 shows a flowchart of an embodiment of a method in accordance with the Case-Based Reasoning System Using Normalized Weight Vectors.

FIG. 3 shows a block diagram of an embodiment of a computing system that may be used to implement a method in accordance with the methods disclosed herein. FIG. 3 and the following description are intended to provide a brief, general description of a suitable computing environment in which an embodiment of the method discussed herein may be implemented. Although not required, the method will be described in the general context of computer-executable instructions, such as program modules, being executed by a personal computer.

Moreover, those skilled in the art will appreciate that embodiments of the method may be practiced with other computer system configurations, including hand-held devices, multiprocessor systems, microprocessor-based or programmable consumer electronics, networked personal computers, minicomputers, mainframe computers, and the like. Embodiments of the method may also be practiced in distributed computing environments where tasks are performed by remote processing devices that are linked through a communications network (such as shown in FIG. 2). In a distributed computing environment, program modules may be located on both local and remote memory storage devices.

System 200 may include a general-purpose computing device in the form of a conventional personal computer 200, which includes processing unit 202, system memory 204, and system bus 206 that operatively couple various system components to other system components (e.g., system bus 206 operatively couples system memory 204 to processing unit 202). Examples of system bus 206 include a memory bus, memory bus controller, peripheral bus and local bus using any of a variety of known bus structures. System memory 204 may include read only memory, random access memory, and a basic input/output system.

System 200 further includes hard disk drive 216 for reading from and writing to a hard disk (not shown) a magnetic disk drive 218 for reading from or writing to a removable magnetic disk 220 (e.g., 4.5-inch disk), and an optical disk drive 222 for reading from and writing to a removable optical disk 224 (e.g., CD-ROM and DVD). Hard disk drive 216, magnetic disk drive 218 and optical disk drive 222 are operatively connected to system bus 206 via hard disk drive interface 226, magnetic disk drive interface 228 and optical drive interface 230, respectively. The drives and their associated computer-readable media provide non-volatile storage of computer readable instructions, information structures, program modules and other information for personal computer 200.

The method steps of embodiments may be stored on a hard disk, magnetic disk 220, and optical disk 224. Although the exemplary environment described herein employs a hard disk, magnetic disk 220 and optical disk 224, it should be appreciated by those skilled in the art that other types of computer readable media that may store information accessible by a computer, (e.g., magnetic cassettes, flash memory cards, digital video disks, Bernoulli cartridges, random access memories (RAMs), and read only memories (ROMs)) may also be used in the exemplary operating environment without departing from the scope or spirit of embodiments of the method.

A user may enter commands and information into personal computer 200 via input devices such as keyboard 240 and pointing devices (e.g., mouse and trackball) (not shown in FIG. 3). Examples of input devices include a microphone, joystick, game pad, and satellite dish. Input devices may be operatively connected to processing unit 202 via universal serial bus (USB) port interface 244 that is operatively connected to system bus 206. Input devices may also be operatively connected to processing unit 202 via other interfaces (e.g., parallel port, serial port and game port) that are operatively connected to system bus 206. Monitor 246 is operatively connected to system bus 206 via video adapter 248.

Other peripheral devices (e.g., speakers and printers) may be operatively connected to system 200 via other interfaces. System 200 may operate in a networked environment using logical connections to one or more remote computers such as remote computer 250 via network a network, such as a local area network, wide area network, and wireless network. Examples of remote computer 250 include a personal computer, server, router, networked personal computer, peer device, and network node.

Figure 5:
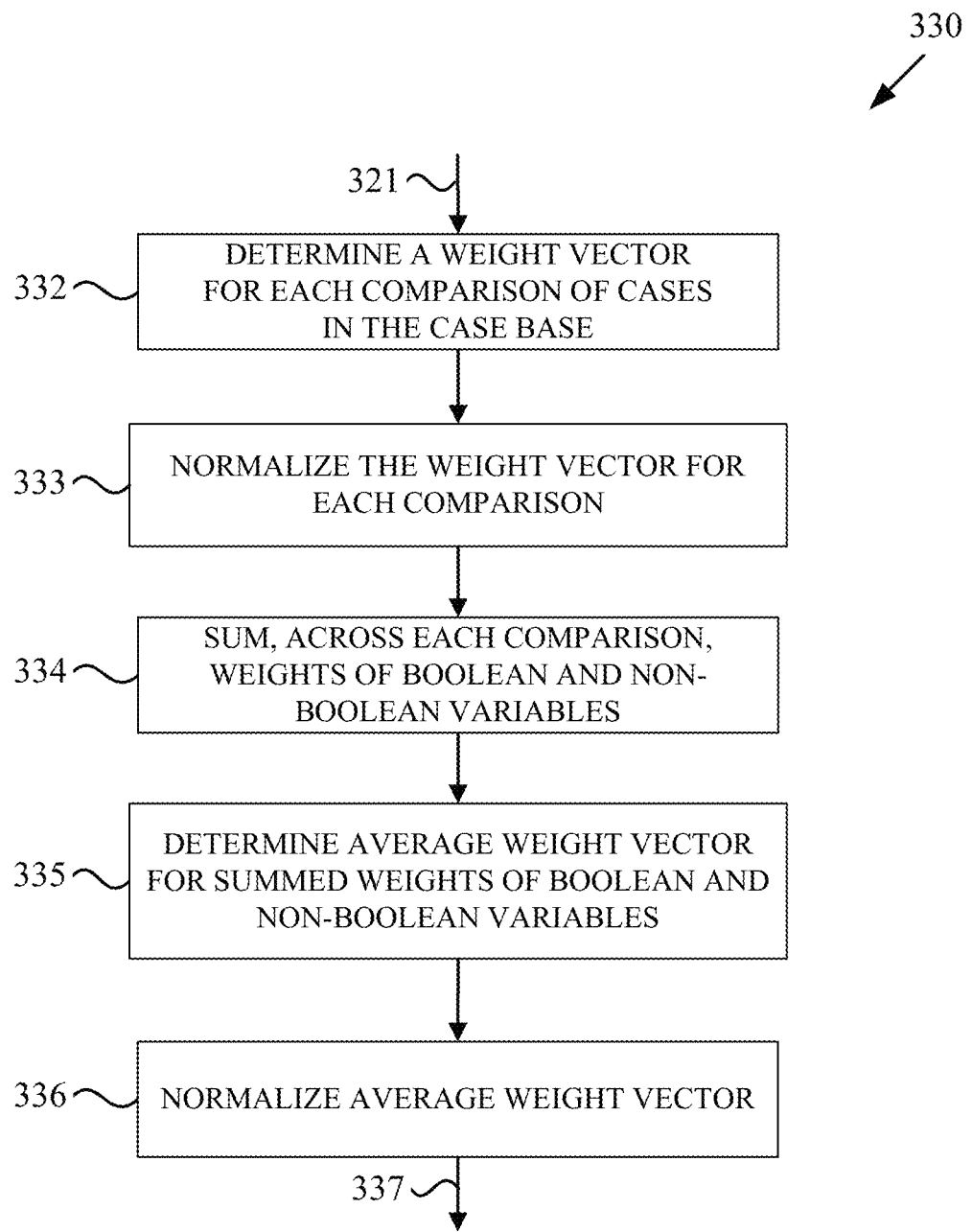
FIG. 5 shows a flowchart of an embodiment of a step for determining a normalized weight vector in accordance with the Case-Based Reasoning System Using Normalized Weight Vectors.

Referring to FIGS. 4 and 5, FIG. 4 shows flowchart of an embodiment of a method 300, while FIG. 5 shows a flowchart of an embodiment of a step 330 for determining a normalized weight vector. Some or all of the steps of method 300 may be performed by a computer having a processing device connected thereto, such as computer 200 shown in FIG. 3 or system 100 shown in FIG. 2.

Method 300 may begin at step 310, which involves providing a case base comprising a plurality of cases arranged in a tabular format, such as shown in Table 1 and FIGS. 6 and 7. Each case includes one or more case base independent weight variables, such as $ind_1$ through $ind_n$ in Table 1, and a domain-specific dependency variable, such as in the "Dep." column in Table 1. The case base independent weight variables comprise case base Boolean variables, such as in the $w_2$ and $w_n$ columns shown in Table 1, and case base non-Boolean variables, such as in the $w_1$ and $w_3$ columns shown in Table 1.

Step 320 then involves normalizing the non-Boolean variables for each case of the case base. As an example, columns $w_1$ and $w_3$ of Table 2 show the normalized non-Boolean variables, with row $c_4$ of Table 2 representing the normalized version of row $c_m$ of Table 1. Using the entry in cell $(c_1, w_1)$ as an example, the value 0.333 was obtained by dividing the same cell entry from Table 1 (10) by the sum of the weights in column 1 of Table 1 (30).

Method 300 then proceeds along flow path 321 to Step 330, which involves determining a normalized weight vector for the case base. Referring to FIG. 5, step 330 includes step 331, which involves comparing the case base Boolean variables and case base non-Boolean variables of each case of the case base to each other to determine a weight vector for each comparison. Table 3 above and the associated description provide an example of the determined weight vectors, which are represented by the rows of Table 3. For example, the weight vector for the comparison between case 1 and case 2 in the case base is designated by $c_{1,2}$ and is [0.167, 1, 0.125, 1]. The weight vector may be determined by calculating $|c_{i,k} - c_{j,k}|$, where $c_i$ and $c_j$ are the context vectors for two cases in the case base and k is a situational (independent) variable. The asterisks in Table 3 represent situational variables that are non-participating (i.e. where variables do not exist in the particular case for comparison). For example, row $c_{1,3}$ in Table 3 contains two asterisks because row $c_3$ in Table 1 does not have values for $ind_1$ and $ind_2$. Step 332 then involves normalizing the weight vector for each comparison. Table 4 shows the normalized rows for each of the case comparisons (i.e. rows) shown in Table 3. For example, the entry in cell $(c_1, w_1)$ in Table 4 (0.0729) was obtained by dividing 0.167 (the corresponding entry in Table 3 for cell $(c_1, w_1)$) by 2.292, which is the sum of the first row in Table 3. Next, step 333 involves summing, across each comparison, the weights of each of the case base Boolean variables and case base non-Boolean variables. Table 4 shows the sum in the row beginning with a $\Sigma$. This row involves the sum of each of weights $w_1$ through $w_4$.

Step 334 involves dividing each of the sums of the weights of each of the case base Boolean variables and case base non-Boolean variables by the number of participating situational variables to determine an average weight vector for each of the case base Boolean variables and case base non-Boolean variables. Table 4 shows the average weight vector in the row beginning with "Avg". As an example, the entry (0.2102) in Table 4 for the cell (Avg, $w_1$) was obtained by dividing the value (0.6306) for the cell ($\Sigma$, $w_1$) by 3. The denominator 3 was used because there were only 3 participating situational variables (one for $c_{1,2}$, one for $c_{1,4}$, and one for $c_{2,4}$). For the calculation for column $w_3$, the denominator would be 6, as there are no asterisks in that column. Step 335 then involves normalizing the average weight vector to determine the normalized weight vector. The normalized weight vector, w, is shown in Table 4 in the row beginning with "Norm." As an example, the entry (0.1785) in Table 4 for the cell (Norm, $w_1$) was obtained by dividing the value (0.2102) for the cell (Avg, $w_1$) by 1.1778, which is the sum of the values in the Avg. row.

Method 300 may then proceed along flow path 337 to step 340, which involves receiving a context comprising one or more contextual independent weight variables, wherein the contextual independent weight variables comprise contextual Boolean variables and contextual non-Boolean variables. The context, with associated contextual Boolean variables and contextual non-Boolean variables, may be configured the same as the case base variables as shown in Table 1 and FIGS. 6 and 7. In some embodiments, the context is user-specified. In some embodiments, the context received may have one or more natural language contextual antecedents which need to be converted into contextual Boolean variables and contextual non-Boolean variables. The natural language contextual antecedents may comprise words, numbers, or any combination thereof. The contextual antecedents may be single words, phrases, sentences, or multiple phrases or sentences.

Further, the natural language contextual antecedents may be in any language identifiable by a user, such as English or Spanish. As an example, the user-specified context may be input by a user from a computer input device, such as keyboard 240. In some embodiments, the natural language contextual antecedents are converted into contextual Boolean variables and contextual non-Boolean variables by use of a hash table that associates the natural language words or phrases, for example, to Boolean or non-Boolean variables.

Step 350 then involves normalizing the contextual non-Boolean variables. Such normalization may be performed in the same manner as the normalization discussed above with respect to the case base non-Boolean variables. Step 360 then involves determining a match between the received context and each case of the case base using the normalized non-Boolean variables for each case of the case base, the normalized contextual non-Boolean variables, and the normalized weight vector for the case base. In some embodiments, the match is determined by using Eq. 1 shown above, where w is the normalized weight vector.

Step 370 then involves determining a skew value for each category of domain specific dependency variables. The skew value is determined, for example, by using a 3-2-1 skew or a uniform skew, as discussed above. In the example discussed above, there were two categories of domain specific dependency variables. One category involved dependencies with a value of one and the other category involved dependencies with a value of two. Cases $c_1$ and $c_4$ shown in Table 2 were in the first category, while cases $c_2$ and $c_3$ shown in Table 2 were in the second category. Step 380 then involves selecting the category of domain specific dependency variables having the minimal skew value. In the example discussed above, the minimum skew value (0.0165) was associated with the second category (i.e. dependency value of two), so the second category was chosen. In some embodiments, method 300 then proceeds to step 390, which involves displaying the value of the selected dependency category on a display, such as display 116 shown in FIG. 2.

Some or all of the steps of method 300 may be stored on a non-transitory computer readable storage medium, wherein the steps are represented by computer readable programming code. The steps of method 300 may also be computer-implemented using a programmable device, such as a computer-based system. Method 300 may comprise instructions that, when loaded into a computer-based system, cause the system to execute the steps of method 300. Method 300 may be implemented using various programming languages, such as "Java", "C", or "C++".

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself, and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

The language used in the specification has been principally selected for readability and instructional purposes, and may not have been selected to delineate or circumscribe the inventive subject matter. Accordingly, the disclosure of the inventive subject matter is intended to be illustrative, but not limiting, of the scope of the invention, which is set forth in the following claims.

Further, many modifications and variations of the Case-Based Reasoning System Using Normalized Weight Vectors are possible in light of the above description. Within the scope of the appended claims, the Case-Based Reasoning System Using Normalized Weight Vectors may be practiced otherwise than as specifically described. Further, the scope of the claims is not limited to the implementations and embodiments disclosed herein, but extends to other implementations and embodiments as contemplated by those having ordinary skill in the art.

I claim:

1. A computer-implemented method comprising the steps of:

providing a system including a computer having a computer input device connected thereto, a display device connected thereto, and a plurality of distributed processors communicatively coupled to the computer, wherein the computer is configured to coordinate the activities of the distributed processors, wherein each of the distributed processors is configured to maintain a case base comprising a plurality of cases arranged in a tabular format, each case comprising one or more case base independent weight variables and a domain-specific dependency variable, wherein the case base independent weight variables comprise case base Boolean variables and case base non-Boolean variables;

normalizing the non-Boolean variables for each case of the case base;

determining a normalized weight vector for the case base;

receiving a context comprising one or more contextual independent weight variables, wherein the contextual independent weight variables comprise contextual Boolean variables and contextual non-Boolean variables;

normalizing the contextual non-Boolean variables;

determining a match between the received context and each case of the case base using the normalized non-Boolean variables for each case of the case base, the normalized contextual non-Boolean variables, and the normalized weight vector for the case base, using the equation $$\text{match}(i) = \frac{\sum_{k=1}^{n} w_k |c_{i,k} - c_{j,k}|}{|\text{participating situational variables}|}, i \neq j,$$

where $c_i$ is a case in the case base, $c_j$ is a received context, and w is the normalized weight vector for the case base;

determining a skew value for each category of domain specific dependency variables;

selecting the category of domain specific dependency variables having a minimal skew value;

comparing the minimal skew value to a user-defined squelch value;

returning feedback to a user of the system that the system is unsure of the result if the minimal skew value exceeds the user-defined squelch value; and returning feedback to a user of the system that the system is sure of the result if the minimal skew value does not exceed the user-defined squelch value.

2. The computer-implemented method of claim 1, wherein the step of determining a skew value for each category of domain specific dependency variables uses a 3-2-1 skew.

3. The computer-implemented method of claim 1, wherein the step of determining a skew value for each category of domain specific dependency variables uses a uniform skew.

4. The computer-implemented method of claim 1, wherein the step of determining a normalized weight vector for the case base comprises the steps of:

comparing the case base Boolean variables and case base non-Boolean variables of each case of the case base to each other to determine a weight vector for each comparison;

normalizing the weight vector for each comparison;

summing, across each comparison, the weights of each of the case base Boolean variables and case base non-Boolean variables;

dividing each of the sums of the weights of each of the case base Boolean variables and case base non-Boolean variables by the number of participating situational variables to determine an average weight vector for each of the case base Boolean variables and case base non-Boolean variables; and normalizing the average weight vector to determine the normalized weight vector.

5. The computer-implemented method of claim 1 further comprising the step of displaying the value of the selected category of domain specific dependency variables on a display.

6. A system comprising:

a computer having a computer input device and a display device connected thereto; and a plurality of distributed processors communicatively coupled to the computer wherein the computer is configured to coordinate the activities of the distributed processors, wherein each of the distributed processors is configured to maintain a case base, wherein each of the plurality of distributed processors are configured to perform a method including the steps of:

providing a case base comprising a plurality of cases arranged in a tabular format, each case comprising one or more case base independent weight variables and a domain-specific dependency variable, wherein the case base independent weight variables comprise case base Boolean variables and case base non-Boolean variables;

normalizing the non-Boolean variables for each case of the case base;

determining a normalized weight vector for the case base;

receiving a context comprising one or more contextual independent weight variables, wherein the contextual independent weight variables comprise contextual Boolean variables and contextual non-Boolean variables;

normalizing the contextual non-Boolean variables;

determining a match between the received context and each case of the case base using the normalized non-Boolean variables for each case of the case base, the normalized contextual non-Boolean variables, and the normalized weight vector for the case base, using the equation $$\text{match}(i) = \frac{\sum_{k=1}^{n} w_k |c_{i,k} - c_{j,k}|}{|\text{participating situational variables}|}, i \neq j,$$

where $c_i$ is a case in the case base, $c_j$ is a received context, and w is the normalized weight vector for the case base;

determining a skew value for each category of domain specific dependency variables;

selecting the category of domain specific dependency variables having a minimal skew value;

comparing the minimal skew value to a user-defined squelch value, wherein if the minimal skew value exceeds the user-defined squelch value, the method further comprises the step of displaying, on the display device, feedback to a user of the system that the system is unsure of the result, and wherein if the minimal skew value does not exceed the user-defined squelch value, the method further comprises the step of displaying, on the display device, feedback to a user of the system that the system is sure of the result; and displaying, via the display device, the value of the selected category of domain specific dependency variables.

7. The system of claim 6, wherein the step of determining a normalized weight vector for the case base comprises the steps of:

comparing the case base Boolean variables and case base non-Boolean variables of each case of the case base to each other to determine a weight vector for each comparison;

normalizing the weight vector for each comparison;

summing, across each comparison, the weights of each of the case base Boolean variables and case base non-Boolean variables;

dividing each of the sums of the weights of each of the case base Boolean variables and case base non-Boolean variables by the number of participating situational variables to determine an average weight vector for each of the case base Boolean variables and case base non-Boolean variables; and normalizing the average weight vector to determine the normalized weight vector.

* * * * *